(12) United States Patent
Wolfer et al.

(10) Patent No.: US 6,337,842 B1
(45) Date of Patent: Jan. 8, 2002

(54) DISK HANDLING SYSTEM HAVING A TELESCOPING ELEVATOR PIN

(75) Inventors: David Wolfer, San Leandro; Wray Russ, Brentwood, both of CA (US)

(73) Assignee: Microboards Technology, L.L.C., Chanhassen, MN (US)

( * ) Notice: Subject to any disclaimer, the term of this patent is extended or adjusted under 35 U.S.C. 154(b) by 0 days.

(21) Appl. No.: 09/088,652

(22) Filed: Jun. 1, 1998

(51) Int. Cl.[7] ............................................. G11B 17/22
(52) U.S. Cl. ......................................... 369/178; 101/35
(58) Field of Search ........................... 369/178, 34, 36, 369/191, 192, 69, 179, 183, 75.2, 77.1; 360/92; 101/35, 44, 36, 37, 43; 414/797.9, 797.4, 798; 221/299

(56) References Cited

U.S. PATENT DOCUMENTS

| | | | |
|---|---|---|---|
| 2,504,596 A | * 4/1944 | Scriven | 274/15 |
| 4,195,961 A | 4/1980 | Waiblinger | 414/120 |
| 4,417,757 A | 11/1983 | Morrison | 294/26 |
| 4,470,137 A | 9/1984 | Tago | 369/100 |
| 4,504,186 A | 3/1985 | Richards | 414/744 |
| 4,595,481 A | 6/1986 | Allen et al. | 204/298 |
| 4,677,508 A | * 6/1987 | Barton, Jr. et al. | 360/96.5 |
| 4,726,615 A | 2/1988 | Goldberg | 294/16 |
| 4,735,540 A | 4/1988 | Allen et al. | 414/222 |
| 4,921,397 A | 5/1990 | Wantanabe | 414/788.4 |
| 5,110,167 A | 5/1992 | Friend | 294/16 |
| 5,123,005 A | * 6/1992 | Kurosu | 369/77.1 |
| 5,218,375 A | * 6/1993 | Hillman | 343/883 |
| 5,397,214 A | 3/1995 | Chueng | 414/796.7 |
| 5,490,020 A | * 2/1996 | Albrecht et al. | 360/96 |
| 5,505,509 A | 4/1996 | Vance | 294/16 |
| 5,692,878 A | 12/1997 | Freund | 414/719.6 |
| 5,734,629 A | 3/1998 | Lee et al. | 369/34 |
| 5,822,162 A | * 10/1998 | Tannert | 360/133 |
| 5,857,710 A | * 1/1999 | Leising | 285/3 |
| 5,957,198 A | * 9/1999 | Haynes | 166/250.03 |
| 6,075,758 A | * 6/2000 | Wu | 369/36 |
| 6,123,020 A | * 9/2000 | Wolfer et al. | 101/35 |
| 6,134,213 A | * 10/2000 | Suzuki et al. | 369/192 |
| 6,135,316 A | * 10/2000 | Wolfer et al. | 221/299 |
| 6,147,960 A | * 11/2000 | Wolfer et al. | 369/178 |

* cited by examiner

Primary Examiner—Hoa T. Nguyen
Assistant Examiner—Tianjie Chen
(74) Attorney, Agent, or Firm—Burns, Doane, Swecker & Mathis, L.L.P.

(57) ABSTRACT

A disk handling system includes a housing, a turntable and a telescoping elevator pin. The turntable mounts on the housing for holding disks. The turntable includes a disk dispenser, which dispenses disks form the turntable. A telescoping elevator pin mounts on the housing, and telescopes to move disks dispensed from the disk dispenser. A mechanical linkage and motor actuate the elevator pin. According to one aspect of the invention, the handling system includes a disk recorder and the elevator pin moves disks from the turntable to the disk recorder. According to another aspect of the invention, the handling system includes a printer and the elevator pin moves disks form the turntable to the printer.

2 Claims, 21 Drawing Sheets

DISK HANDLING SYSTEM HAVING A TELESCOPING ELEVATOR PIN

CROSS-REFERENCE TO RELATED APPLICATIONS

This invention relates in subject matter to commonly assigned U.S. patent applications Nos. 09/036,550 and 09/036,572 filed on Mar. 6 1998, and 09/042,147 filed Mar. 13, 1998, the disclosures of which are incorporated herein by reference.

FIELD OF THE INVENTION

This invention relates to disk handling systems and particularly to compact disk (CD's) handling and duplication systems.

BACKGROUND OF THE INVENTION

Disk handling systems typically move a single disk between a stack of disks and a workstation. Such systems are particularly useful for handling memory storage disks such as CD's. Some disk handling systems include disk duplicators and printers, for example.

A typical disk duplicator reads a CD to be duplicated and writes the data to a blank CD. One known CD handling and duplication system includes a turntable with a disk dispenser, a CD recorder, and an elevator pin. The CD recorder has an extendable tray. During operation, the turntable moves a blank CD to adjacent the elevator pin. The disk dispenser dispenses the disk onto the elevator pin. The elevator pin lowers the disk onto the CD recorder tray. Once the CD writer completes writing to the CD, the tray extends and the elevator pin lifts the CD from the tray to the turntable.

Other CD duplication systems employ robotic arms, gantry systems and other handling devices to move CD's from a stack to a CD writer. Disk printers for printing indicia on the disk surface have been combined with known CD handling systems.

While the typical CD duplication works reliably and effectively, users may desire more throughput, i.e. an increase in the number of disks handled per hour. Unfortunately, the time required for duplication is often limited by the speed of the CD writer. What is desired is a reliable way of increasing the throughput of a typical disk handling system.

SUMMARY OF THE INVENTION

A disk handling system, in accordance with the present invention includes housing, a turntable, a telescoping elevator pin and a means for actuating the elevator pin. The housing encloses a portion of the system and allows disks, such as memory storage disks to be loaded on to the turntable.

The turntable mounts on the housing and rotates for moving disks from one location to another. A workstation is integrated with the housing to duplicate disks, print indicia on disks, to test disk function, to clean or to polish disk surfaces. It can be appreciated that the workstation can perform any of a variety of functions in accordance with the present invention.

An elevator pin lifts and lowers disks between the workstation and the turntable. The elevator pin precisely aligns disks on the workstation. For example, the workstation may include a disk recorder with a sliding drawer, the elevator pin precisely guides a disk on to the sliding drawer. Precise alignment of the disk on the drawer minimizes disk mis-feed that can cause a disk to jam the sliding drawer.

The elevator pin telescopes. Telescoping is important to maintain alignment of the elevator pin with respect to the turntable and with respect to the workstation. Telescoping enables the elevator pin to cover a distance longer than the elevator pin while maintaining precise alignment.

According to one aspect of the invention, the elevator pin has cylindrical sleeves, which coaxially align and slide with respect to each other to enable the elevator pin to telescope. The elevator pin has a spring member in contact with at least one sleeve to bias the sleeves apart. A mechanical linkage cooperates with a motor to actuate the elevator pin and move disks between the turntable and the workstation. Preferably, the mechanical linkage attaches to the motor and to one sleeve of the elevator pin. The motor rotates to reciprocate the mechanical linkage and actuate the elevator pin.

According to another aspect of the invention, the elevator pin has three sleeves, an fixed sleeve, an intermediate sleeve and an working sleeve. The intermediate sleeve aligns the working sleeve with the fixed sleeve when the elevator pin telescopes. Preferably, the fixed sleeve attaches to the housing. The present invention is particularly useful as part of a system for duplicating and printing on disks.

DETAILED DESCRIPTION

Figure 1:
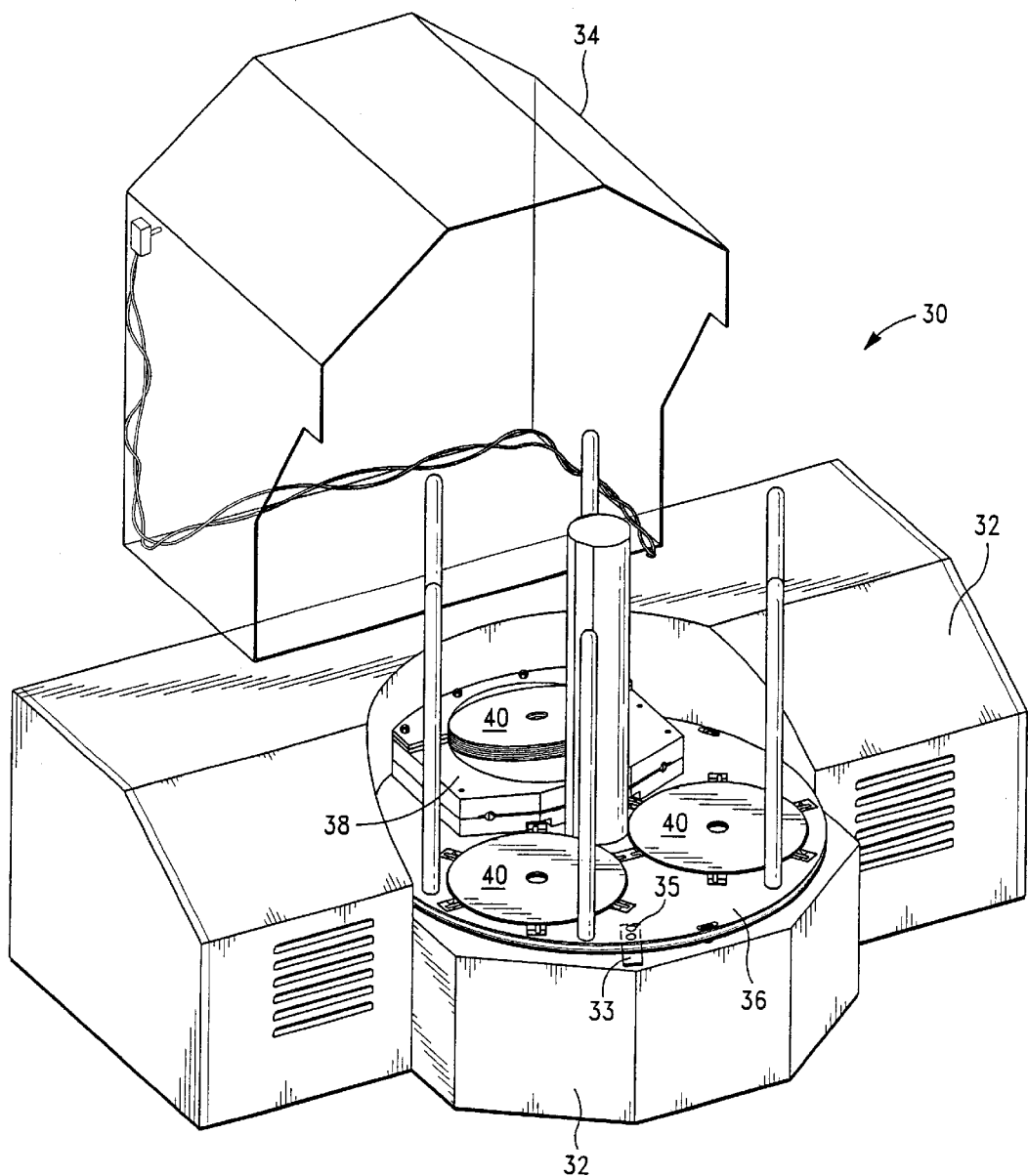
FIG. 1 is a perspective view of a disk duplication system in accordance with the present invention.

FIG. 1 shows a disk duplication system, generally designated with the reference numeral 30. The system 30 includes a housing 32 with a cover 34, a turntable 36, and a disk dispenser 38. The turntable 36 includes several hoppers for feeding and accepting memory storage disks 40. The turntable 36 rotates to move the disks 40 along an arcuate path. The system 30 includes a sensor 33 mounted on a portion of the housing 32, adjacent the turntable 36.

The housing 32 encloses a CD recorder for writing data on disks. The disk dispenser 38 dispenses disks 40 into the recorder. When data writing is complete, the turntable 36 rotates and accepts the written disk in a selected hopper. Further rotation of the turntable 36 enables the disk dispenser 38 to dispense another disk into the CD recorder, repeating the data writing process.

The turntable 36 includes embedded magnets 35. The sensor 33 detects the magnets 35 to enable the system to recognize when the turntable 36 is in a desired rotational position with respect to the housing 32.

The disk dispenser 38 of the present invention is useful in conjunction recording data on memory storage disks such as compact disks, and duplicating compact disks. It can be appreciated, however, that a variety of media including optical or magnetic memory storage media may be dispensed and duplicated in accordance with the present invention. According to one variation of the invention, the housing 32 encloses a CD printer for printing indicia on disk surfaces and the disk dispenser 38 dispenses disks to the CD printer.

Figure 2:
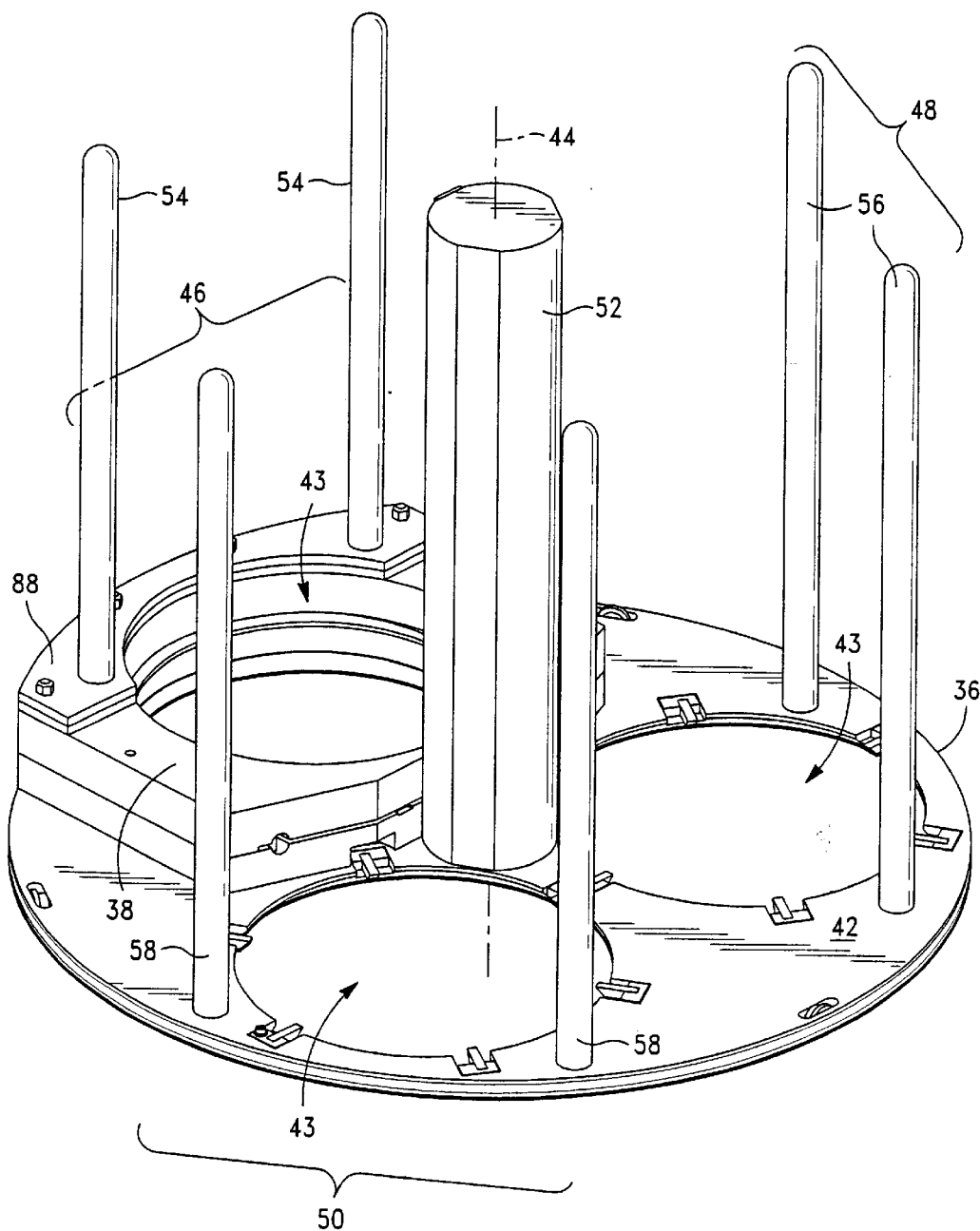
FIG. 2 is a perspective view of the turntable of FIG. 1.

FIG. 2 shows the turntable 36. The turntable 36 includes a central post 52, outer posts 54, 56 and 58, a surface 42 defining three openings 43. The turntable has an axis 44, a generally designated feed hopper 46, accept hopper 48, and reject hopper 50. The hoppers 46, 48 and 50 generally align adjacent a respective opening 43 to dispense or accept disks through each respective opening.

The disk dispenser 38 mounts on the turntable 36 adjacent one opening 43 to dispense disks through the turntable 36. The outer posts 54 cooperate with the central post 52 to define the hopper 46 which guides disks into the disk dispenser 38.

The central post 52 aligns with the turntable axis 44. The outer posts 54, 56 and 58 are positioned co-radially with respect to the turntable axis 44. The outer posts 56 and 58 cooperate with the central post 52 to surround the respective turntable openings 43 and to define the reject hopper 48 and accept hopper 50, respectively. Although outer posts 54, 56 and 58 cooperate with the central post 52 to define the hoppers 46, 48 and 50 and provide a light weight structure to guide disks, one can appreciate that hoppers may assume any of a number of configurations. A cylindrical wall may define a hopper, for example. Also for example, a helical coil, or by another structure having a lightweight design could define the hopper.

Figure 3:
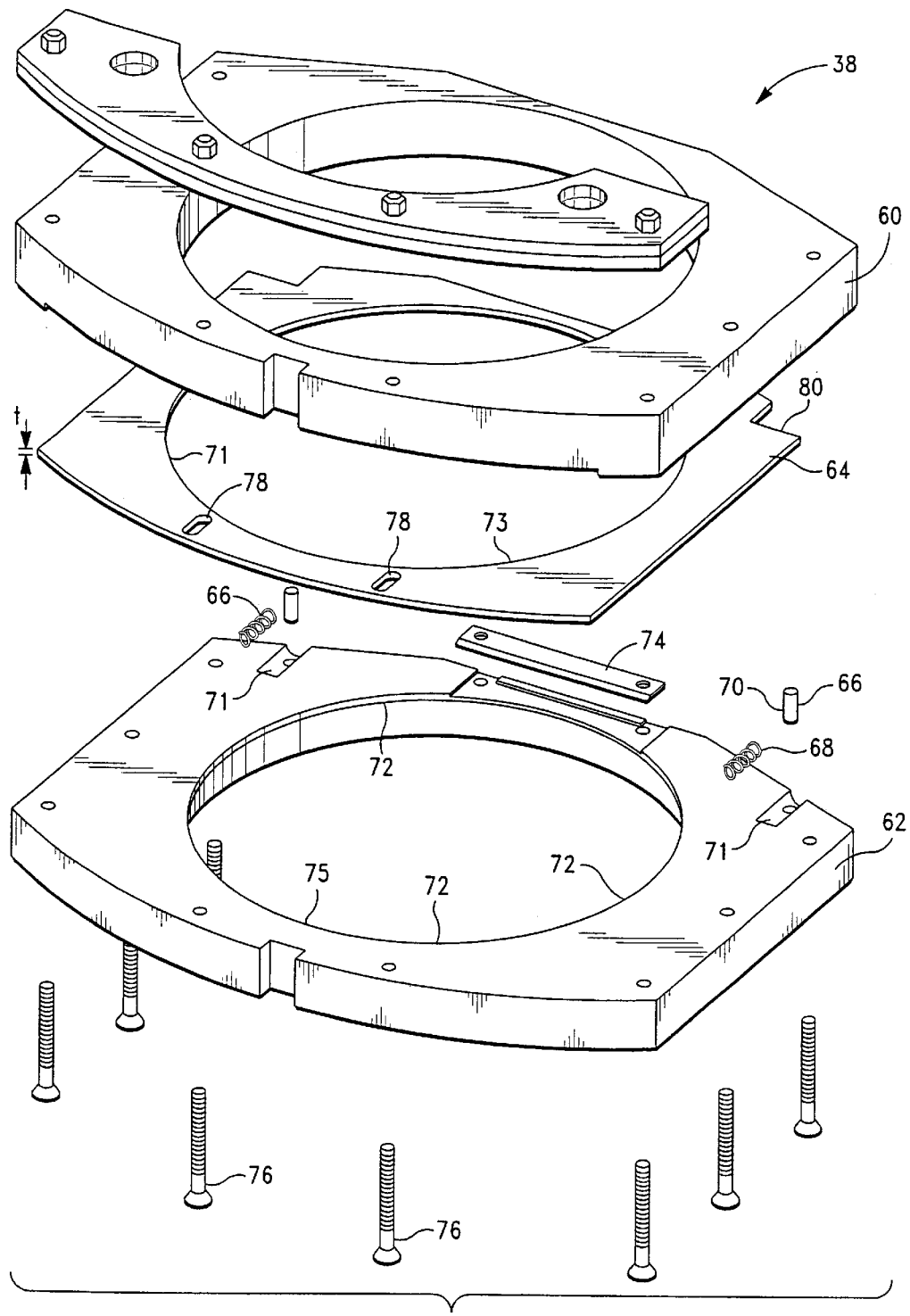
FIG. 3 is an exploded perspective view of the disk dispenser of FIG. 1.

FIG. 3 shows an exploded view of the disk dispenser, generally designated 38. The disk dispenser 38 includes an upper guide 60, a lower guide 62 and a plate 64. The lower guide 62 includes a spring 68, a rim 72, a support lip 74, an opposing edge 75, and fasteners 76. The plate 64 includes an arced edge 71. The arced edge 71 defines an inner periphery 73. The inner periphery 73 defines an opening for surrounding a disk. Preferably, the inner periphery 73 is circular for circumscribing a disk. The inner periphery 73 is configured with a beveled edge for separating single disks from a stack of disks.

The upper guide 60, the lower guide 62 and the plate 64 each define a generally circular opening to enable a disk to pass through the disk dispenser 38. Each opening is sized for a disk to pass through when the disk parallels the plate 64. The upper guide 60 and the lower guide 62 are axially offset from each other so that a portion of the rim 72 of lower guide 62 stops disks which may fall thorough the upper guide 60 towards the lower guide 62. The opposing edge 75 diametrically opposes the support lip 74. The support lip 74 cooperates with the opposing edge 75 to hold a disk on the lower guide 62. The plate 64 slidably mounts between the upper guide 60 and the lower guide 62 to selectively pass disks stopped by the lower guide 40 through the lower guide 62.

The pin 70 extends between the lower guide 62 and the upper guide 60 to retain the spring 68. The plate 64 includes a pair of holes 78, which align with respective fasteners 76. The fasteners 76 extend through the upper guide 60, the plate 64 and the lower guide 62 to hold the upper guide 60 and the lower guide 62 together. The fasteners 76 retain the plate 64 between the upper guide 60 and the lower guide 62. The fasteners 76 align the plate 64 relative to the upper guide 60 and the lower guide 62 when the plate 64 slides.

The lower guide 62 includes a groove 71. The spring 68 is a coil spring having two ends. The spring 68 lies in the groove 71. The pin 70 inserts perpendicularly into the groove 71. Accordingly, one end of the spring 68 contacts the pin 70. The spring 68 biases the plate 62 in a desired position. According to one aspect of the invention, the spring 68 offsets the plate 62 from the lower guide 62 to enable the lower guide 62 to support a disk.

The plate 64 has a shoulder with an edge 80. The edge 80 contacts the other end of the spring 68. The spring 68 biases the plate 64 into a desired position relative to the lower guide 62. When the plate 64 slides towards the pin 70, the spring 68 dampens movement of the plate 64. The plate 64 has a generally uniform thickness "t". The thickness "t" approximates the thickness of an individual disk to be dispensed so that when the plate 64 slides, only one disk is dispensed.

Figure 4:
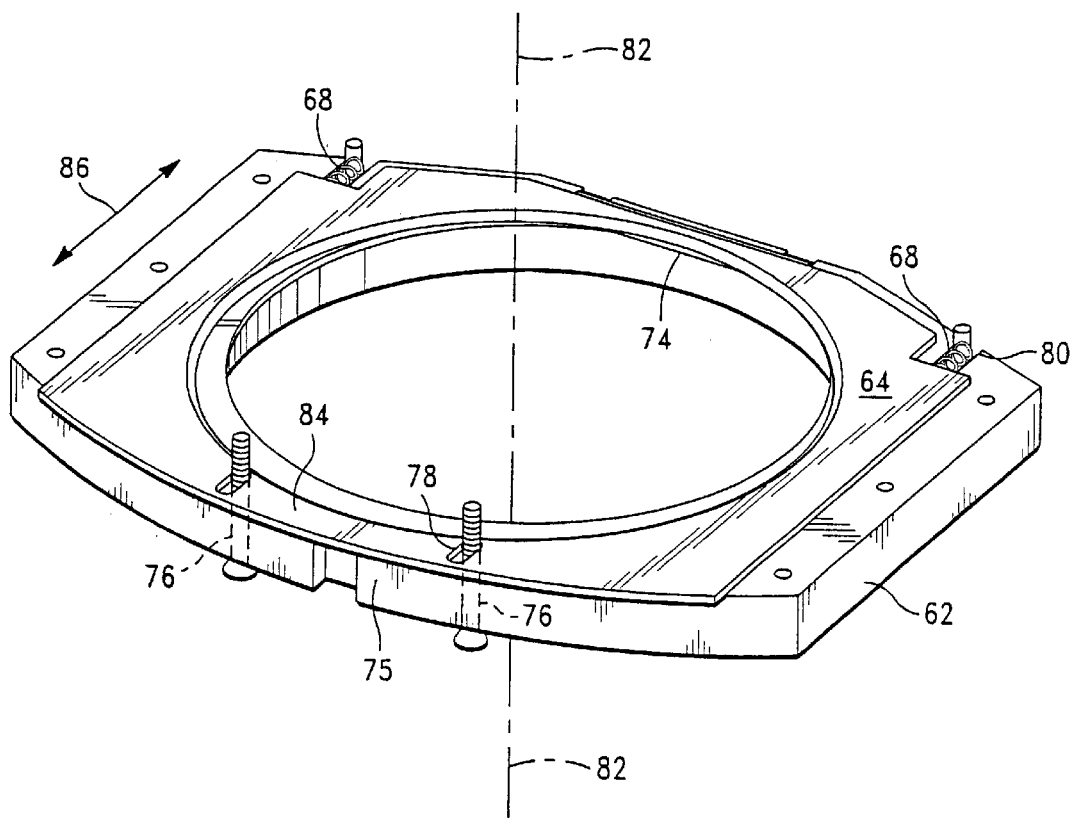
FIG. 4 is a perspective view of a portion of the dispenser of FIG. 3.

FIG. 4 is a perspective view of the plate 64 and the lower guide 62. The plate 64 reciprocates with respect to the lower guide in the directions of the arrows 86. The lower guide 62 opening defines an axis 82. The spring 68 biases the plate 64 so that the plate opening is axially offset from the lower guide opening. Offsetting the plate 64 opening from the lower guide 62 opening enables the support lip 74, in cooperation with the opposing edge 75, to hold a disk on the lower guide 62. The plate 64 circumscribes a disk when the disk is on the lower guide 62. The plate 64 slides towards the springs 68 to dispense a disk through the lower guide 62 opening. The springs 68 reciprocate the plate 64.

Figure 5:
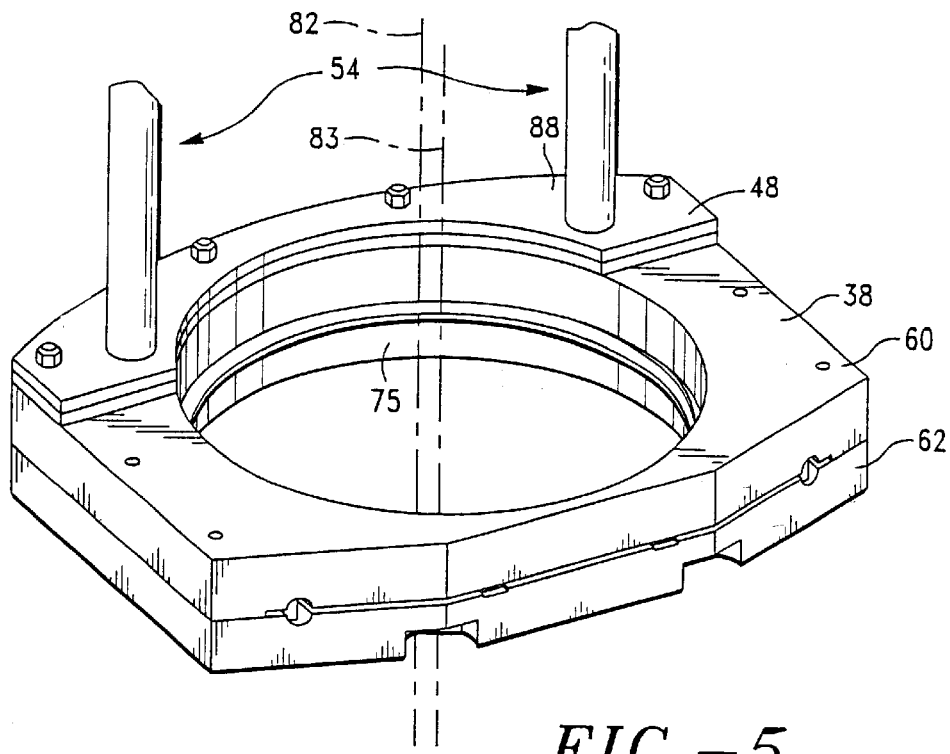
FIG. 5 is a perspective view of the disk dispenser of FIG. 3 and a portion of a feed hopper.

FIG. 5 is a perspective view of the disk dispenser 38 attached to the feed hopper 46. The feed hopper 46 is configured with a reinforcement plate 88, which bolts to the upper guide 60. The outer posts 54 mount on the reinforcement plate 88. Accordingly, the feed hopper attaches to the disk dispenser. The reinforcement plate 88 inhibits flexion of the disk dispenser 38 while supporting the feed hopper 46 (see FIG. 2).

The upper guide 60 has an opening with an axis 83. The axis 82 of the lower guide 62 opening is axially offset from the axis 83 of the upper guide 60 opening.

Figure 6:
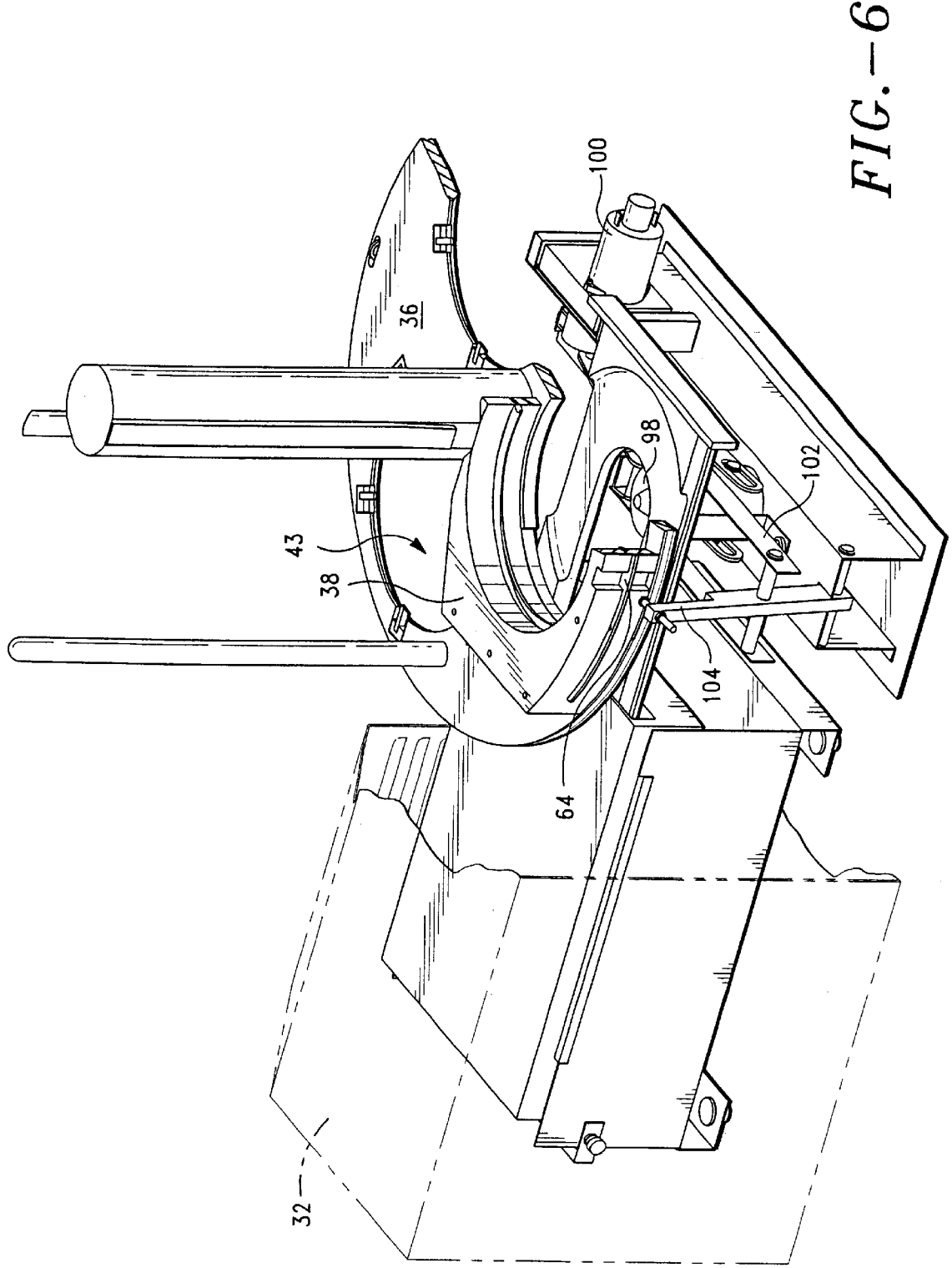
FIG. 6 shows a cutaway rear perspective view of the system of FIG. 1.

FIG. 6 shows a cutaway rear perspective view of the housing 32. The housing 32 includes a motor 100, a mechanical linkage 102, the elevator pin 98 and an arm 104. The arm 104 and the elevator pin 98 are connected via the mechanical linkage 102 to the motor 100. The motor 100 actuates the mechanical linkage 102 to cause the arm 104 to slide the plate 64 and to lift and lower the elevator pin 98. Movement of the linkage 102 and rotation of the turntable 36 dispense disks, one at a time, from the dispenser 38 onto the elevator pin 98. Movement of the linkage 102 may also insert disks, one at a time, through the opening 43 in the turntable 36 when the turntable 36 rotates.

According to one aspect of the invention, the elevator pin 98 is a single unit. According to another aspect of the invention, the elevator pin 98 has multiple components, which extend and retract.

Figure 7:
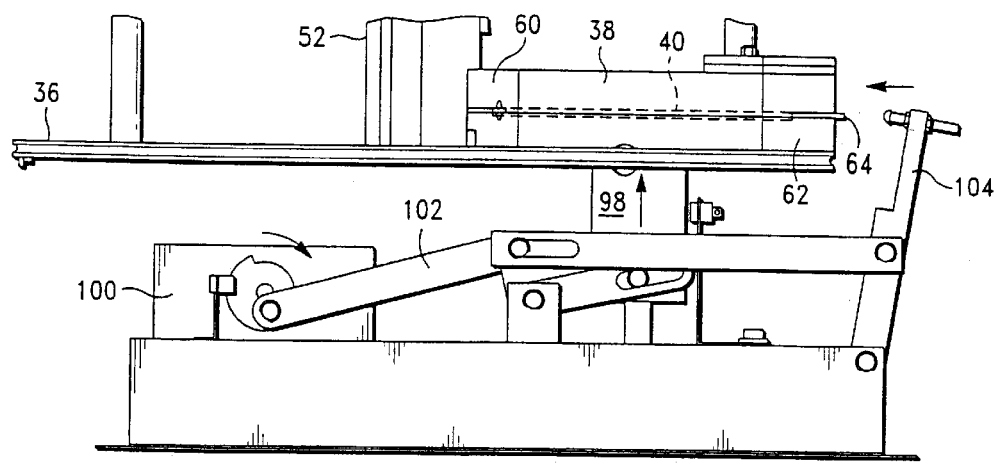
FIG. 7, FIG. 8, and FIG. 9 are side views, in sequence, of the elevator pin moving a disk from the turntable of FIG. 1.

FIG. 7 shows a side view of the disk dispenser 38, the turntable 36 and the linkage 102. The motor 100 actuates the linkage 102. The linkage 102 elevates the elevator pin 98 towards the turntable 36 and moves the arm 104. The arm 104 moves towards the plate 64 of the disk dispenser.

Figure 8:
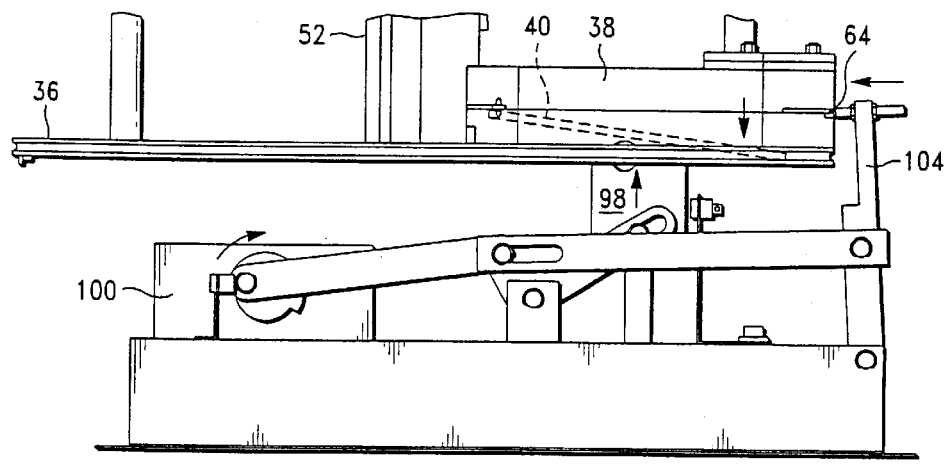

FIG. 8 shows further movement of the linkage 102. The arm 104 presses against the plate 64 to slide the plate 64. Sliding the plate 64 relative to the upper guide 60 and the lower 62 guide causes the dispenser 38 to drop the disk 40 onto the elevator pin 98.

Figure 9:
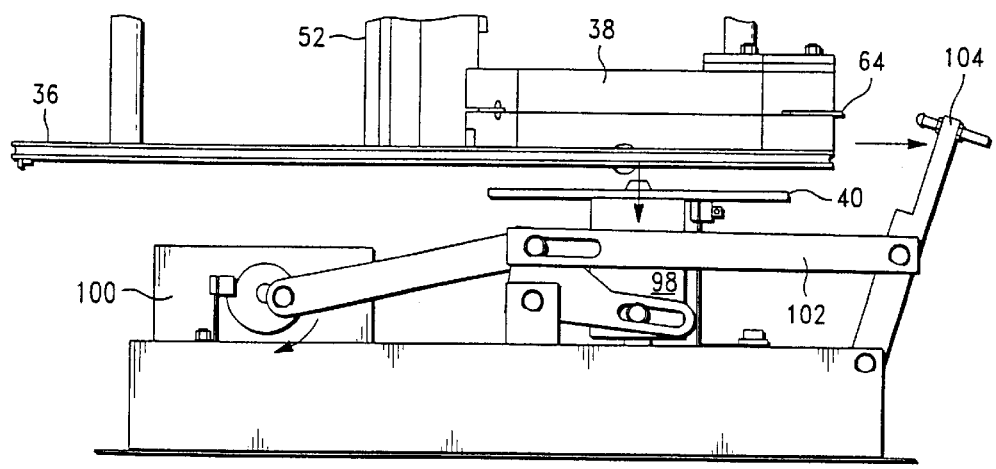

FIG. 9 shows further movement the linkage 102. The elevator pin 98 retracts from the dispenser 38. The arm 104 simultaneously withdraws from the dispenser 38. The elevator pin 98 lowers the dispensed disk 40 away from the dispenser 38.

A single elevator pin cycle is completed when the elevator pin 98 retracts and the arm 104 withdraws. At this point in the cycle, the turntable 36 rotates. Rotation of the turntable 36 enables a subsequent cycle of the elevator pin 98 to lift the disk 40 back onto the turntable 36, for example.

Figure 10:
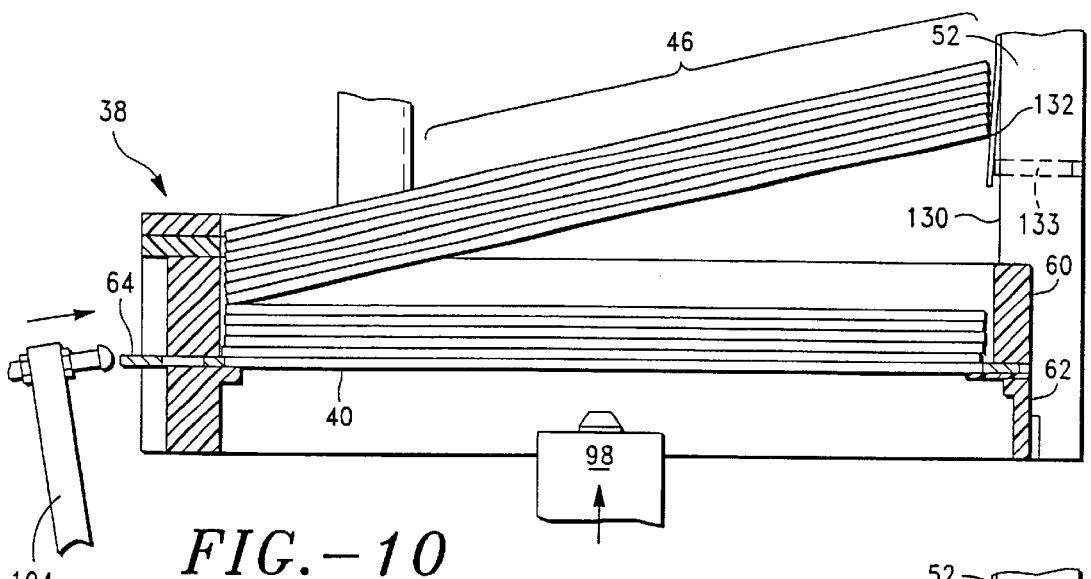
FIG. 10, FIG. 11 and FIG. 12 correspond with FIG. 7, FIG. 8 and FIG. 9, respectively, and show partial cross-sectional views of the disk dispenser from a reversed angle.

FIG. 10 shows the arm 104 moving towards the plate 64. The support lip 74 and the opposing edge 75 of the lower guide 62 support the disk 40. The elevator pin 98 moves towards the dispenser 38 and the arm 104 moves towards the plate 64. Preferably, the upper guide 60 holds from 4–6 disks in parallel with the plate. The three hoppers are each adapted to hold between 100–150 disks.

The central post 52 of the feed hopper 46 includes a recessed portion 130, an extended portion 132 and an adjustable set screw 133. The recessed portion 130 is adjacent the upper guide 60 to feed disks, in horizontal alignment with the plate 64, from the feed hopper 46 to the upper guide 60. The set screw 133 rotatably extends through the central post 52 to adjust the distance at which the extended portion 132 extends from the central post 52 and insures proper feeding of disks from the feed hopper 46 to the upper guide 60.

The extended portion 132 angles disks stacked in the feed hopper 46 with respect to the plate 64. Angling disks within the feed hopper 46 minimizes forces caused by disk weight on the disk dispenser 38, and particularly on the plate 64. Minimizing such forces enables multiple disks to be stacked in the feed hopper 46 and optimizes reliability of the disk dispenser.

Figure 11:
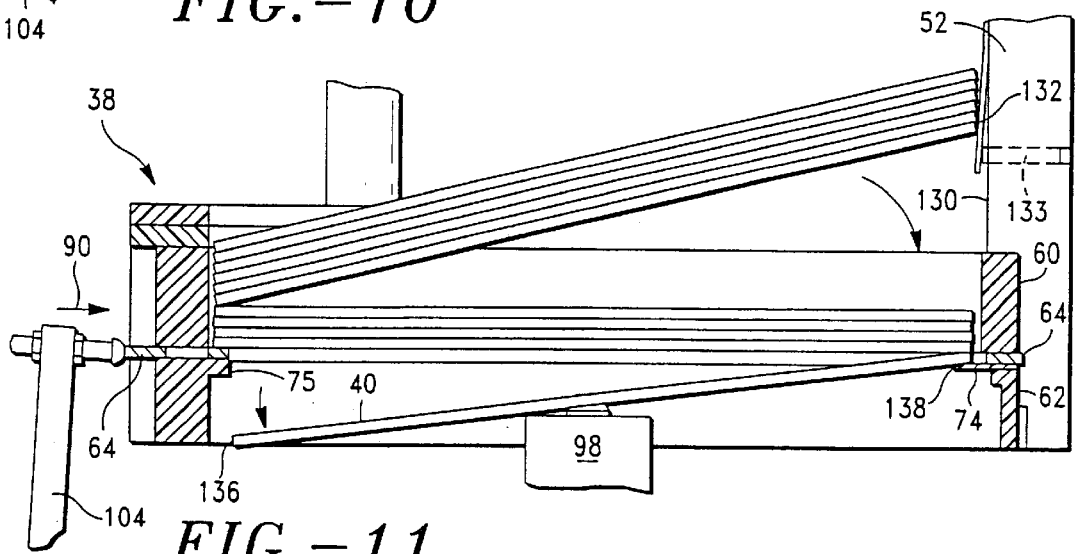

FIG. 11 shows the arm 104 contacting the plate 64. The disk 40 has two opposing edges 136 and 138. The arm 104 contacts the plate 64 to slide the plate 64 in the direction of the arrow 90. The plate 64 urges the edge 136 of the disk 40 off of the edge 75 of the lower guide 62. Reciprocation of the plate 64 urges the other edge 138 of the disk 40 off of the support lip 74 so that the disk 40 falls from the lower guide 60 onto the elevator pin 98.

Figure 12:
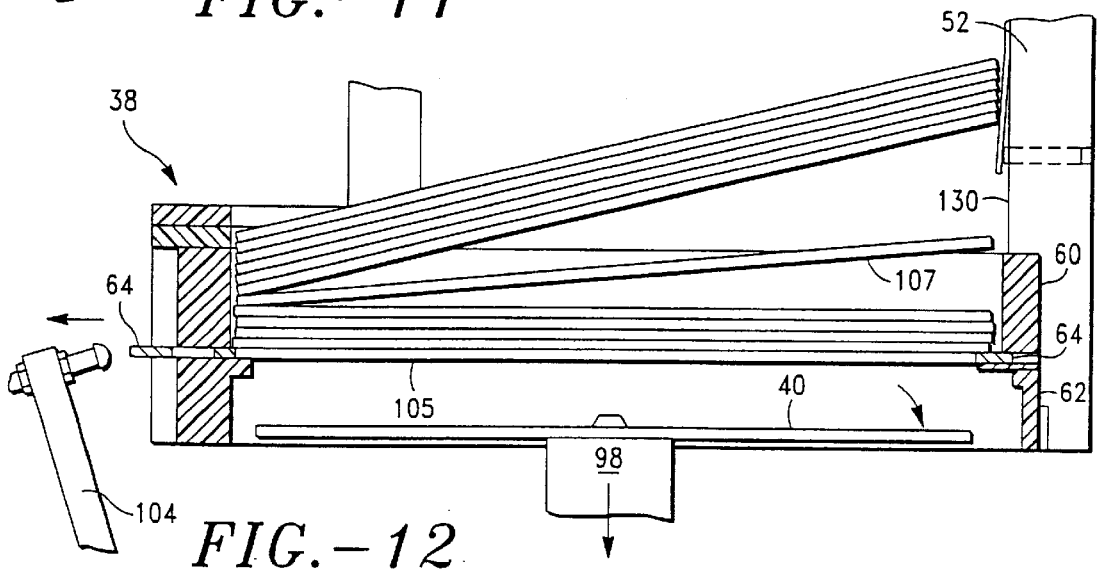

FIG. 12 shows the arm 104 withdrawn from the plate 64. The plate 64 automatically reciprocates as the arm 104 withdraws. The plate 64 guides the next disk 105 onto the lower guide 62. Movement of the next disk 105 onto the lower guide 62 causes another disk 107 to fall from the hopper into the upper guide 60.

Figure 13:
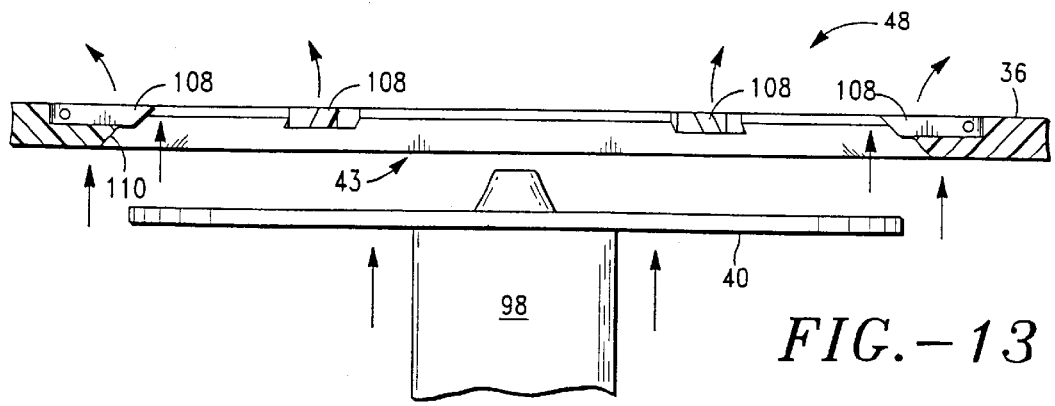
FIG. 13, FIG. 14 and FIG. 15 show a cross-sectional side view of the elevator pin lifting a disk.

FIG. 13 shows the elevator pin 98 extending to lift the disk 40 towards the turntable 36 from below the opening 43 of the accept hopper 48. The turntable defines the opening 43 to enables disks to pass into the accept hopper from beneath the turntable 36. The turntable 43 includes a periphery 110 surrounding the opening 43. A plurality of disk clips 108 mount on the periphery 110. The disk clips 108 function to allow the disk 40 to move through the turntable 36 into the accept hopper in only one direction, in the direction of the arrow 106.

Figure 14:
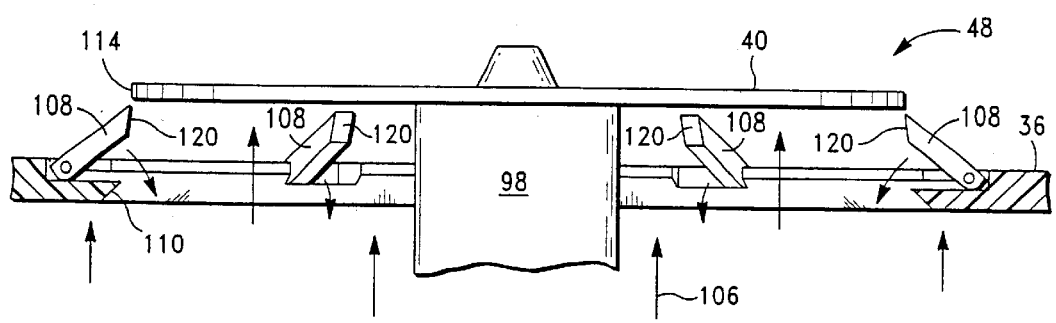

FIG. 14 shows the elevator pin 98 lift the disk 40 in the direction of the arrows 106 above the turntable 36. The elevator pin 98 passes through the turntable 36 with the disk 40. The disk 40 lifts the disk clips 108 as the disk 40 passes through the turntable 36. The disk 40 has an outer edge 114. The disk clips have ends 120. As the elevator pin 98 passes through the turntable, the outer edge 114 of the disk contacts the ends 120 of the disk clips 108.

The ends 120 of the disk clips 108 are angled to contact primarily the outer edge 114 of the disk 40. The angled ends 120 align the disk 40 in parallel with the turntable 36 as the disk passes through the turntable 36. This alignment insures that the disk 40 will not flutter on the elevator pin 98 when the elevator pin 98 extends to lift the disk 40 through the turntable 36. The elevator pin 98 retracts to place the disk 40 on to the disk clips 108.

Figure 15:
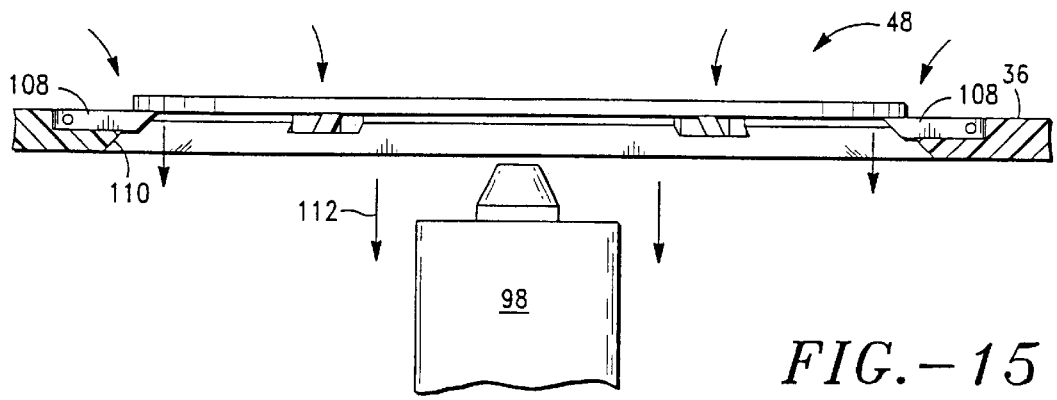

FIG. 15 shows the elevator pin 98 reciprocating in the direction of the arrows 112. The disk clips 108 extend radially towards the center of the opening 110. The elevator pin drops the disk 40 on the disk clips 108 so that the disk clips support the outer edge 114 of the disk 40. The disk clips 108 align with the turntable 36 to support the disk 40 on the turntable 36. The disk clips 108 are configured, having strength enough to support a stack of disks.

Repeating the process shown in FIG. 13, FIG. 14 and FIG. 15 that elevator pin stacks multiple disks on the disk clips 108 via the turntable opening 110 from beneath the turntable 36. To enable the disk clips 108 support a stack of disks, the elevator pin 98 is strong enough to lift the stack of disks supported when the elevator pin 98 lifts a disk through the turntable 36.

Figure 16:
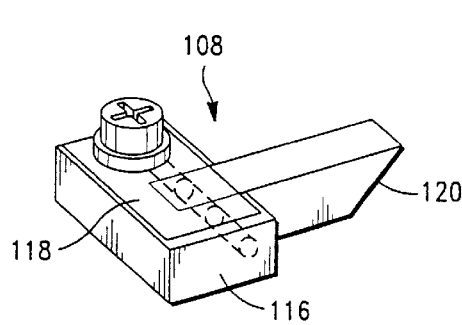
FIG. 16 and FIG. 17 show a disk clip in accordance with FIG. 15 and FIG. 14, respectively.

FIG. 16 shows a disk clip 108. The disk clip 108 includes a hinge 116, a spring 118 and the angled end 120. The spring 118 includes a strip of resilient material, which covers a portion of the disk clip 108 to bias the disk clip 108 in the configuration shown.

Figure 17:
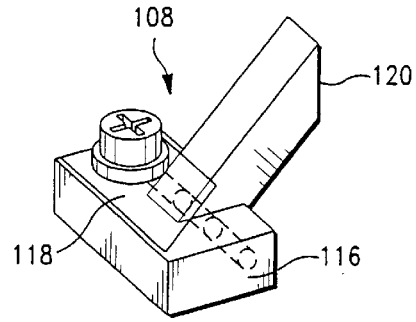

FIG. 17 shows the disk clip 108 rotated about the hinge 116. The disk clip 108 extends at an angle with respect to the hinge 116. The spring 118 flexes and the beveled edge 120 aligns perpendicularly to the hinge 116 and to the turntable surface, see FIG. 13.

Figure 18:
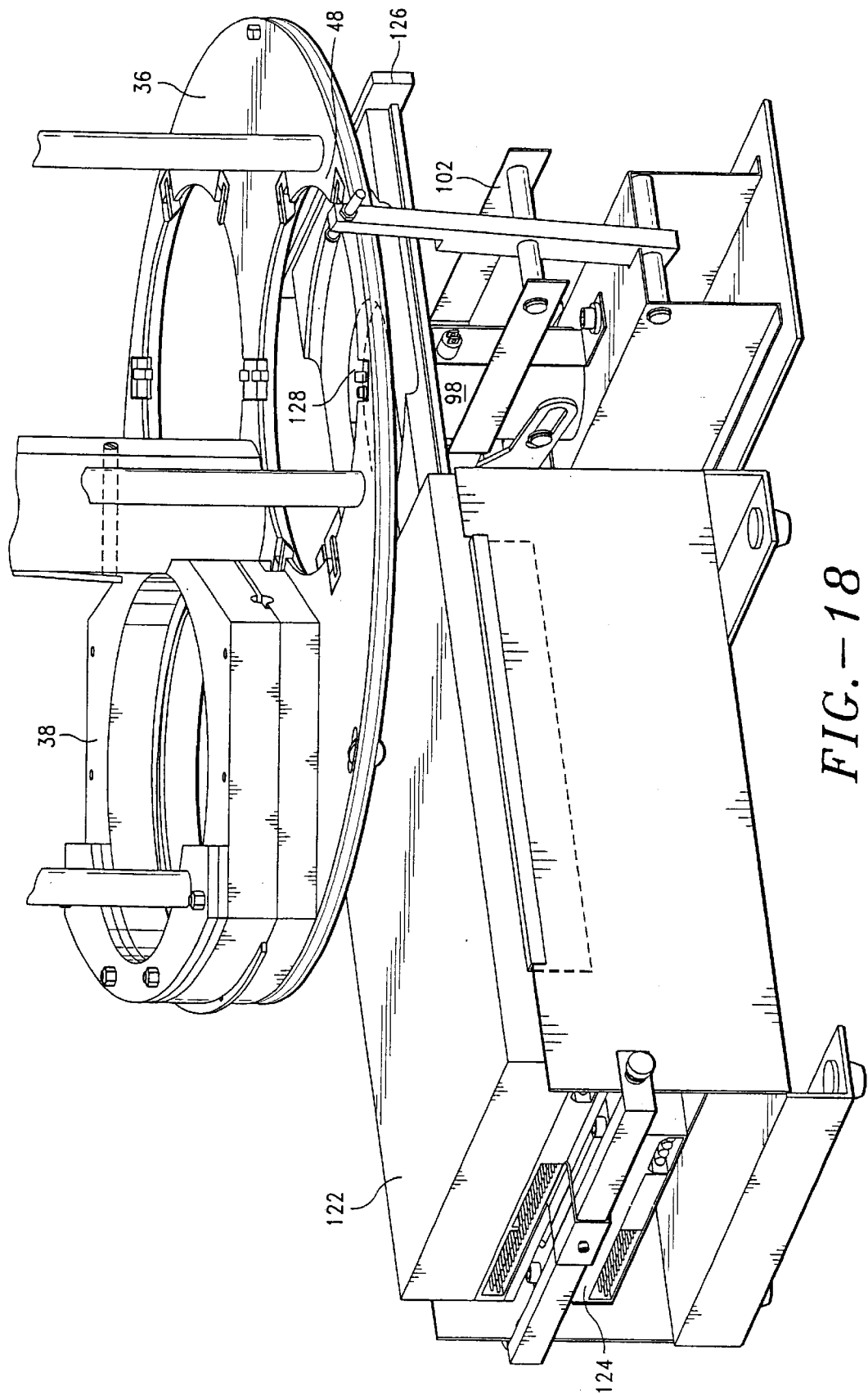
FIG. 18 is a perspective view of a disk recorder positioned in an operative arrangement with respect to the turntable and linkage mechanism in accordance with the present invention.

FIG. 18 shows the turntable 36, a recorder 122, a hard drive 124, the elevator pin 98, and the mechanical linkage 102. The recorder 122 includes a tray 126. The tray 126 automatically extends from the recorder 122 to interpose a disk between the elevator pin 98 and the turntable 36, or to catch a disk, which is dispensed from the disk dispenser 38.

The tray 126 includes an opening 128 to enable the elevator pin 98 to extend through the turntable 36, via the tray 126. The hard drive 124 couples with the recorder 122 to deliver data to be written. A controller including a circuit board within the housing regulates operation of the hard drive 124, the recorder 122, the linkage 102 and the turntable 36.

According to one aspect of the invention, the recorder 122 is a Compact Disk Recorder. Preferably, the housing 32 of FIG. 1 encloses the recorder 122, the hard drive 124, the pin 98 and the linkage 102. The recorder 122 in combination with the disk dispenser 38, turntable 36 and the elevator pin 98 enables duplication of recordable CD's.

Figure 19:
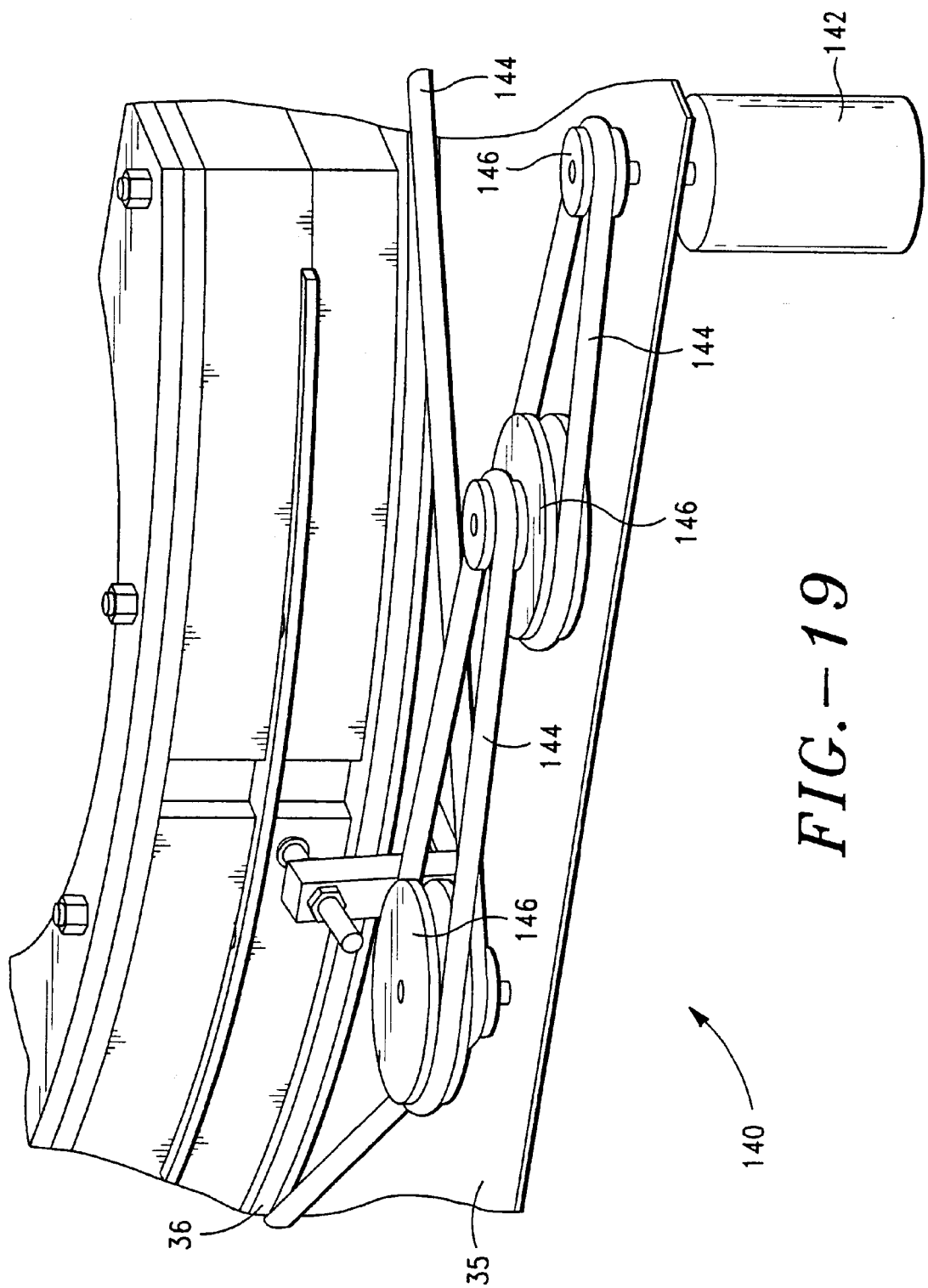
FIG. 19 is a perspective view of the drive linkage for the turntable of FIG. 1.

FIG. 19 is a perspective view of a portion of the linkage assembly, generally designated 140, which rotates the turntable 36 in accordance with the present invention. The drive linkage assembly 140 mounts on a portion of the housing 32. The assembly 140 includes a motor 142, belts 144, and pulleys 146. The belts 144 and pulleys 146 operate to selectively rotate the turntable 36 at a desired rate.

Figure 20:
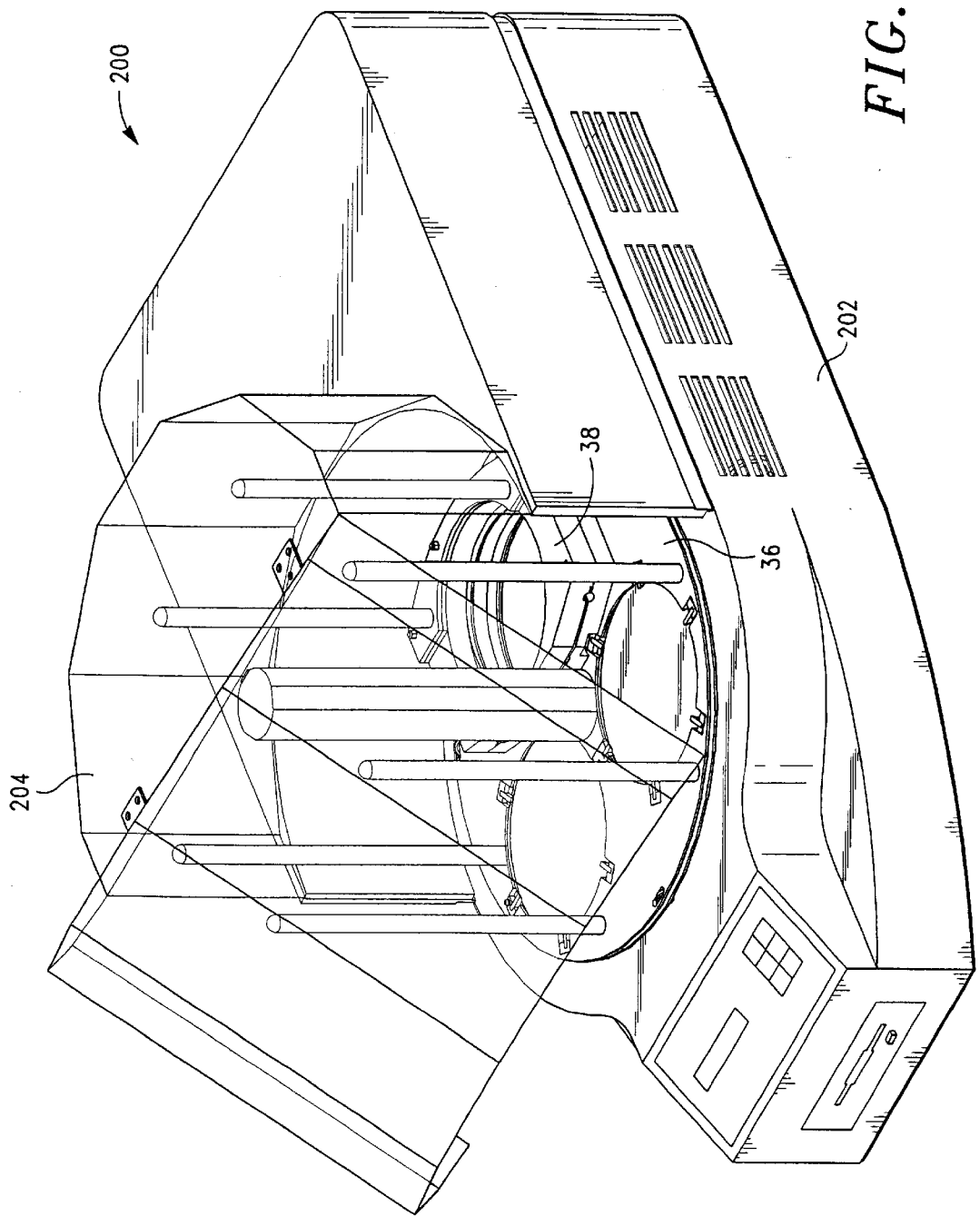
FIG. 20 is a perspective view of a disk recorder in combination with a disk printer.

FIG. 20 shows a disk duplicating and printing apparatus 200. The apparatus 200 includes a housing 202, which encloses a disk recorder and a disk printer. The apparatus 200 includes a turntable 36 having a disk dispenser 38, and a transparent cover 204.

The transparent cover 204 is split and includes hinges 206 to enable the cover 204 to open and close without requiring removal of the cover from the housing. The cover 204 is transparent to enable inspection of the disk duplicating and printing apparatus 200 during operation.

While the turntable and disk dispenser are shown in conjunction with a recorder and a printer, it can be appreciated that the turntable and dispenser can be used in any of a number of operations which are performed on memory storage disks, including cleaning, polishing, re-recording, packaging, and reading, etc.

Figure 21:
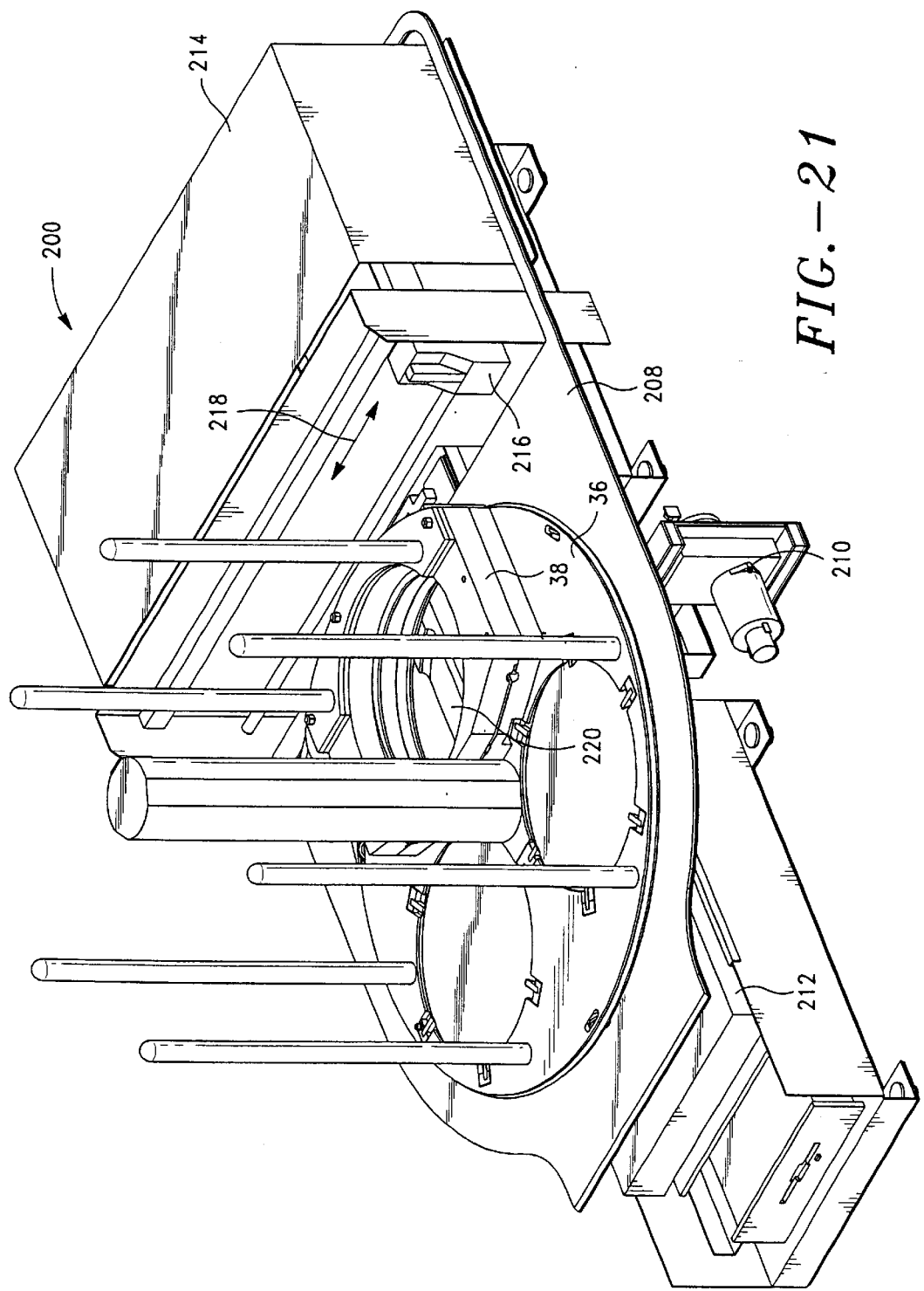
FIG. 21 is a perspective view of the combination of FIG. 20 without a cover.

FIG. 21 shows the apparatus 200 having a frame 208, a motor 210, a disk recorder 212 and a disk printer 214. The disk recorder 212, disk printer 214 and motor 210 mount on the frame 208. The motor 210 rotates the turntable 36 to move disks between the turntable 36, the disk recorder 212 and the disk printer 214. The motor 210 also actuates the disk dispenser 38.

The printer 214 has a tray 220, which extends and retracts. The printer 214 includes an ink jet cartridge 216, which reciprocates in the direction of the arrows 218 to enable the printer 214 to write on disk surfaces. According to one aspect of the invention, the printer 218 is a SIGNATURE® printer and the ink jet cartridge 216 reciprocates across a disk to print on the disk surface as the tray 220 extends.

Figure 22:
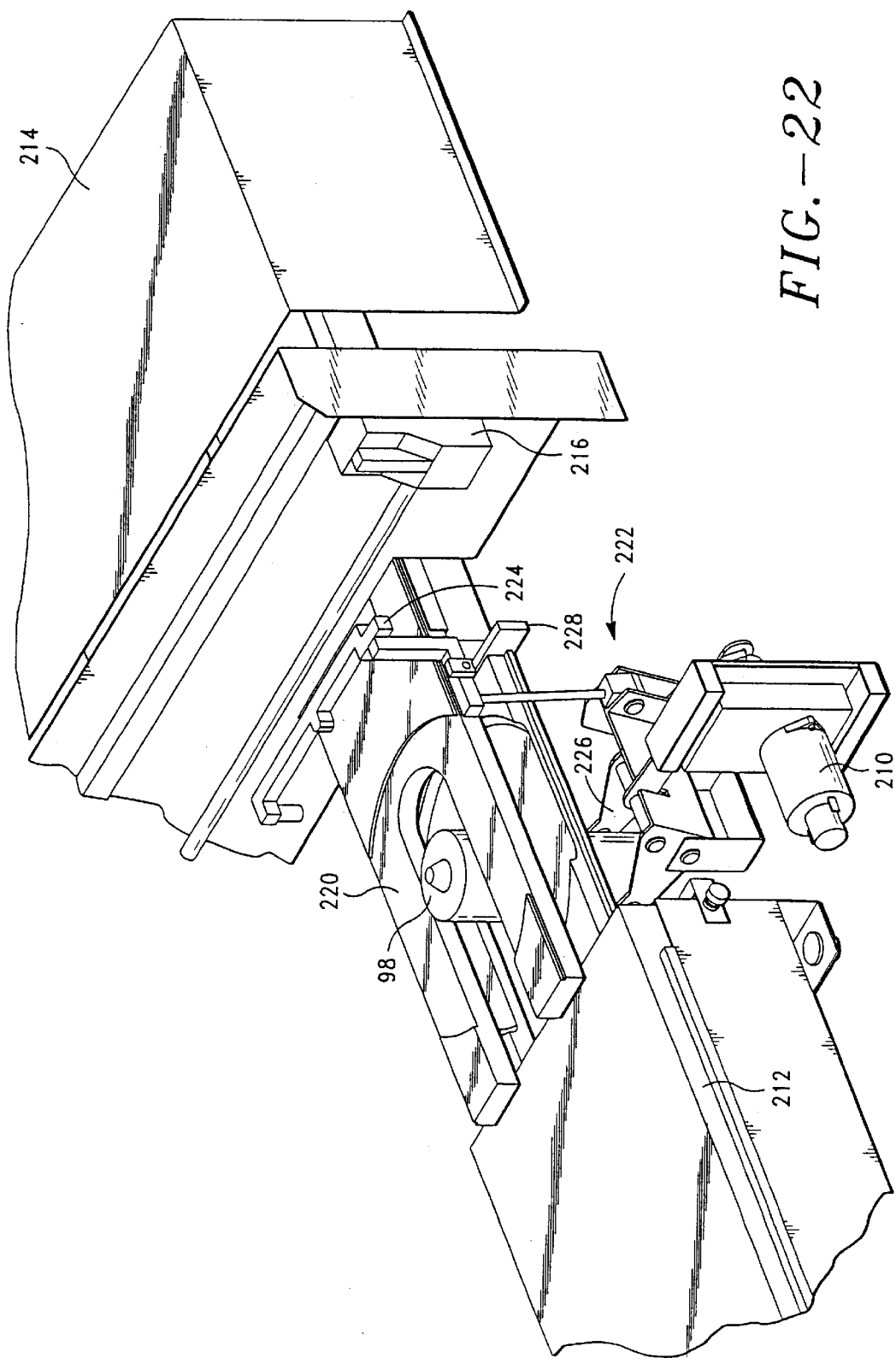
FIG. 22 is a perspective view of the writer tray, the printer tray and the elevator pin in accordance with the invention of FIG. 20.

FIG. 22 shows the printer 214, the recorder 212, the motor 210 and an elevator pin linkage 222. The elevator pin linkage assembly 222. The elevator pin linkage assembly 222 includes a disk dispenser actuator 224 and an elevator pin actuator 226. Accordingly, the elevator pin linkage assembly 222 coordinates the elevator pin 98 and the disk dispenser actuator 224.

The elevator pin 98 extends and retracts. The recorder 212 includes a tray 228. The tray 228 includes a central opening to allow the elevator pin to extend through. A portion of the tray 220 is bifurcated to form a U shaped opening. Bifurcation of at least a portion the tray 220 enables the tray 220 to extend and retract when the elevator pin 98 extends. Accordingly, the tray 220 can extend or retract independently of the relative position of the elevator pin 98.

The tray 220 of the printer 214 and the tray 228 of the recorder 212 oppose each other. This is not the only possible configuration. Conceivably, the recorder trays and printer trays can radially align, or stack above an appropriately configured elevator pin in accordance with the present invention.

Figure 23:
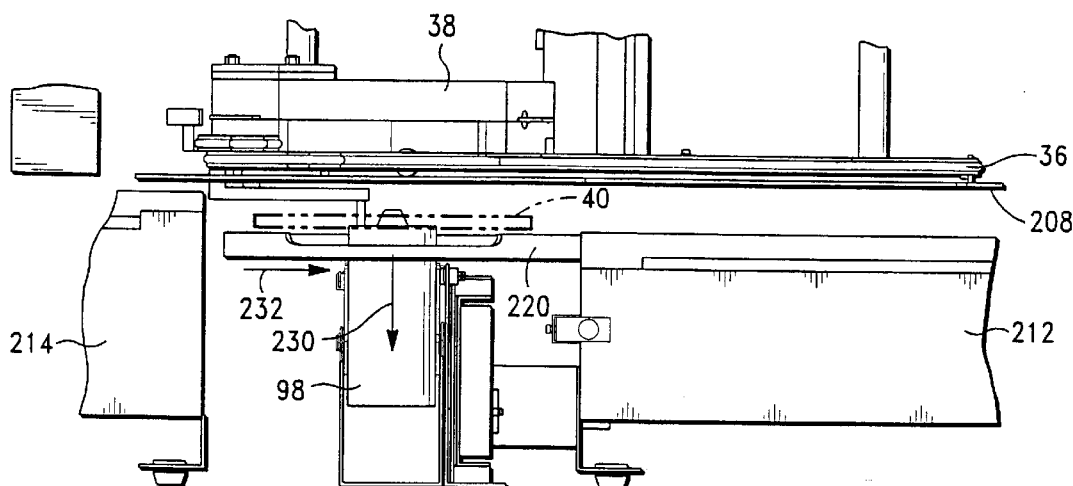
FIG. 23, FIG. 24, FIG. 25, FIG. 26, FIG. 27 and FIG. 28 show a sequence of movement of the writer tray and printer tray of FIG. 22 in accordance with the present invention.

FIG. 23 shows the turntable 36 mounted on the frame 208. The recorder 212, the printer 214, and the elevator pin 98 mount adjacent the turntable 36. The recorder tray 220 extends fully. The elevator pin 98 extends through the recorder tray 220, towards the turntable 36. The disk dispenser 38 dispenses a disk 40 onto the elevator pin 98. The elevator pin 98 retracts in the direction of the arrow 230 to lowers the disk 40 onto the recorder tray 220 and continues to retract to free the recorder tray 220 from interference with the elevator pin 98 to enable the recorder tray 220 to retract. After the disk 40 is on the recorder tray 220, and the elevator 98 pin retracts, the recorder tray 220 retracts into the recorder 212 in the direction of the arrow 232 to record data on the disk 40. After data is recorded on the disk 40, the recorder tray 220 extends.

Figure 24:
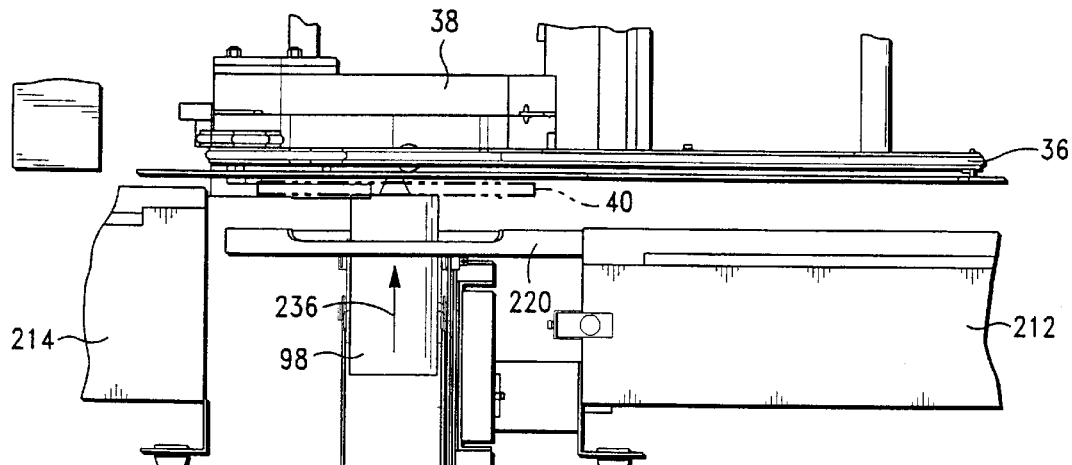

FIG. 24 shows the recorder tray 220 extended after the recorder 212 completes disk recording. The elevator pin 98 extends through the tray 220, lifting the disk 40 from the tray 220, towards the turntable 36 in the direction of the arrow 236. The next step is to print indicia on the disk 40.

Figure 25:
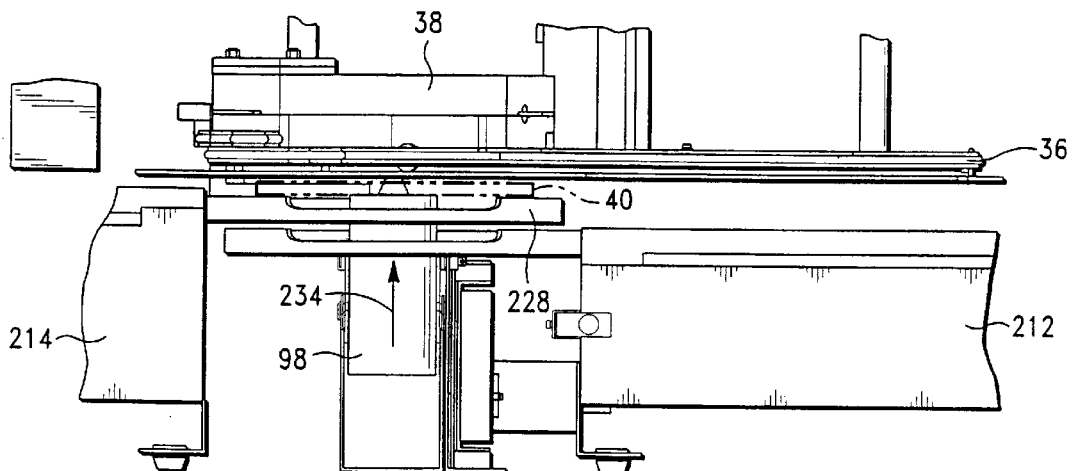

FIG. 25 shows the printer tray 228 extending. Because the printer tray 228 is bifurcated, having a U shaped opening, the printer tray 228 moves past the elevator pin 98 to adjacent the disk. The elevator pin 98 lowers the disk 40 onto the printer tray 228 in the direction of the arrow 234.

Figure 26:
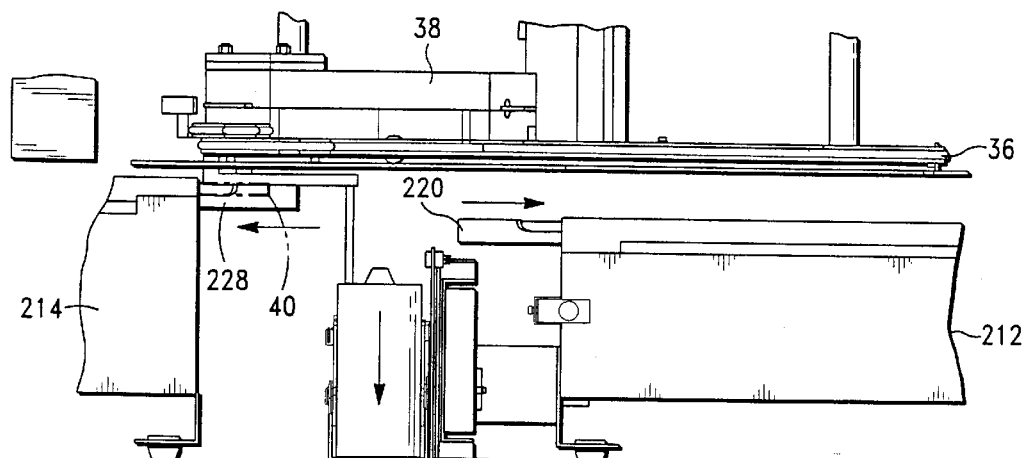

FIG. 26 shows the printer tray retracting. According to one aspect of the invention, the printer 214 prints on the disk 40 while the printer tray 228 retracts. According to another aspect of the invention, the printer 214 prints on the disk 40 when the printer tray 228 extends. According to either aspect, the printer tray 228 fully re-extends upon completion of printing.

Figure 27:
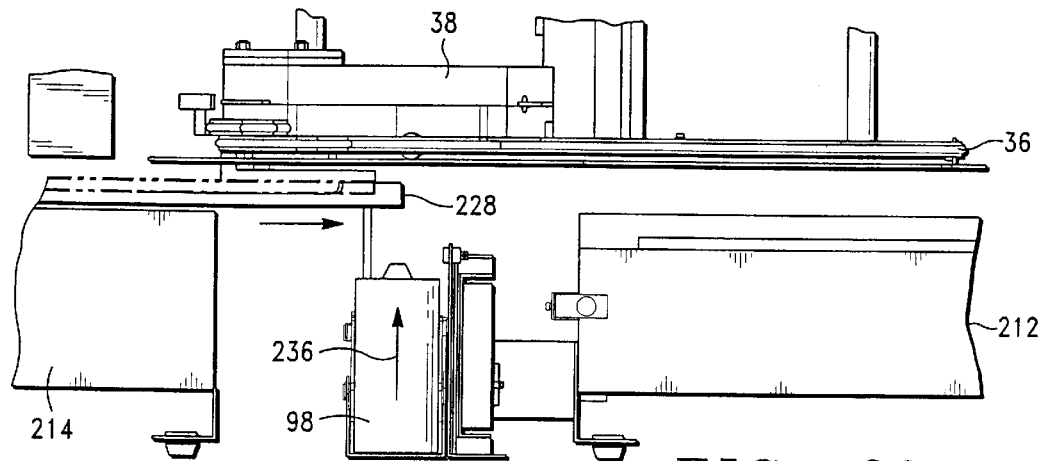

FIG. 27 shows the printer tray 228 extending towards a fully extended position. As the printer tray 228 extends, the turntable 36 rotates and the elevator pin 98 extends towards the turntable 36 in the direction of the arrow 236.

Figure 28:
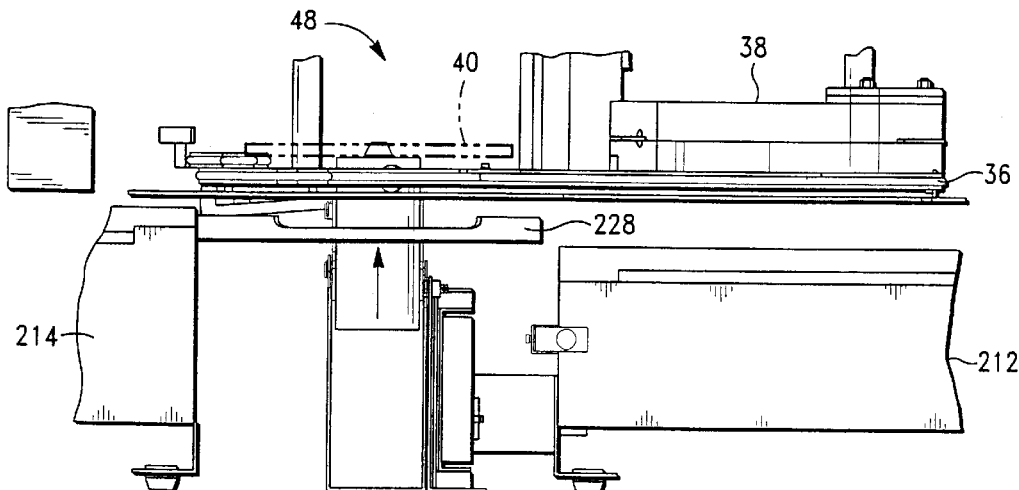

FIG. 28 shows the turntable 36 rotated to position the accept hopper 48 adjacent the elevator pin 98. The elevator pin 98 lifts the printed disk 40 from the printer tray 228. The elevator pin 98 lifts the printed disk 40 fully onto the turntable 36 into the accept hopper 48.

The turntable 36 rotates to position the disk dispenser 38 above the elevator pin 98, another disk 40 is dispensed, and the elevator pin 98 lowers the newly dispensed disk to the recorder 212 to repeat the sequence shown in FIG. 23–FIG. 28, inclusively.

Figure 29:
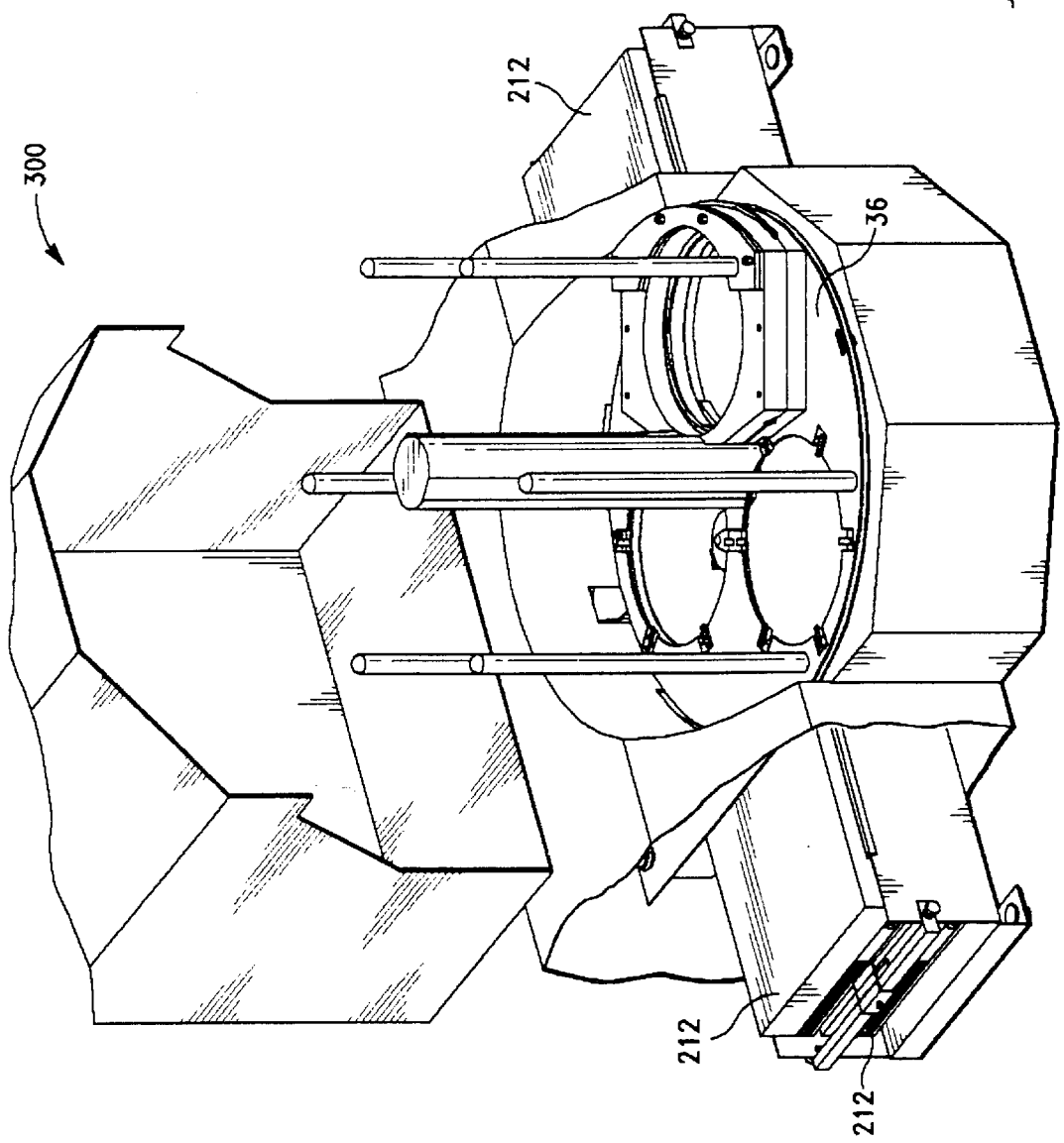
FIG. 29 shows a partially cutaway perspective view of disk duplication system having multiple recorders in accordance with the present invention.

FIG. 29 shows a disk handling system, generally designated with the reference numeral 300. The disk handling system includes a turntable 36 and multiple disk recorders 212. The system 300 connects to a computer network, or to a stand-alone computer via a standard connection such as a network card and cable, or a serial cable, respectively. Accordingly, data, which is to be duplicated, is communicated to the disk handling system. The multiple disk recorders 212 simultaneously write the data to disks held in the disk recorders 212. When the data is written, the disk handling system 300 sequentially removes the disks from the disk recorders and places the disks on the turntable. This sequence repeats.

It can be appreciated that the disk recorders 212 are but one example of a workstation type, which can be used in accordance with the present invention. For example, the disk recorders 212 may be replaced with disk printers, disk cleaners, disk surface testing devices and other useful devices in accordance with the present invention.

Figure 30:
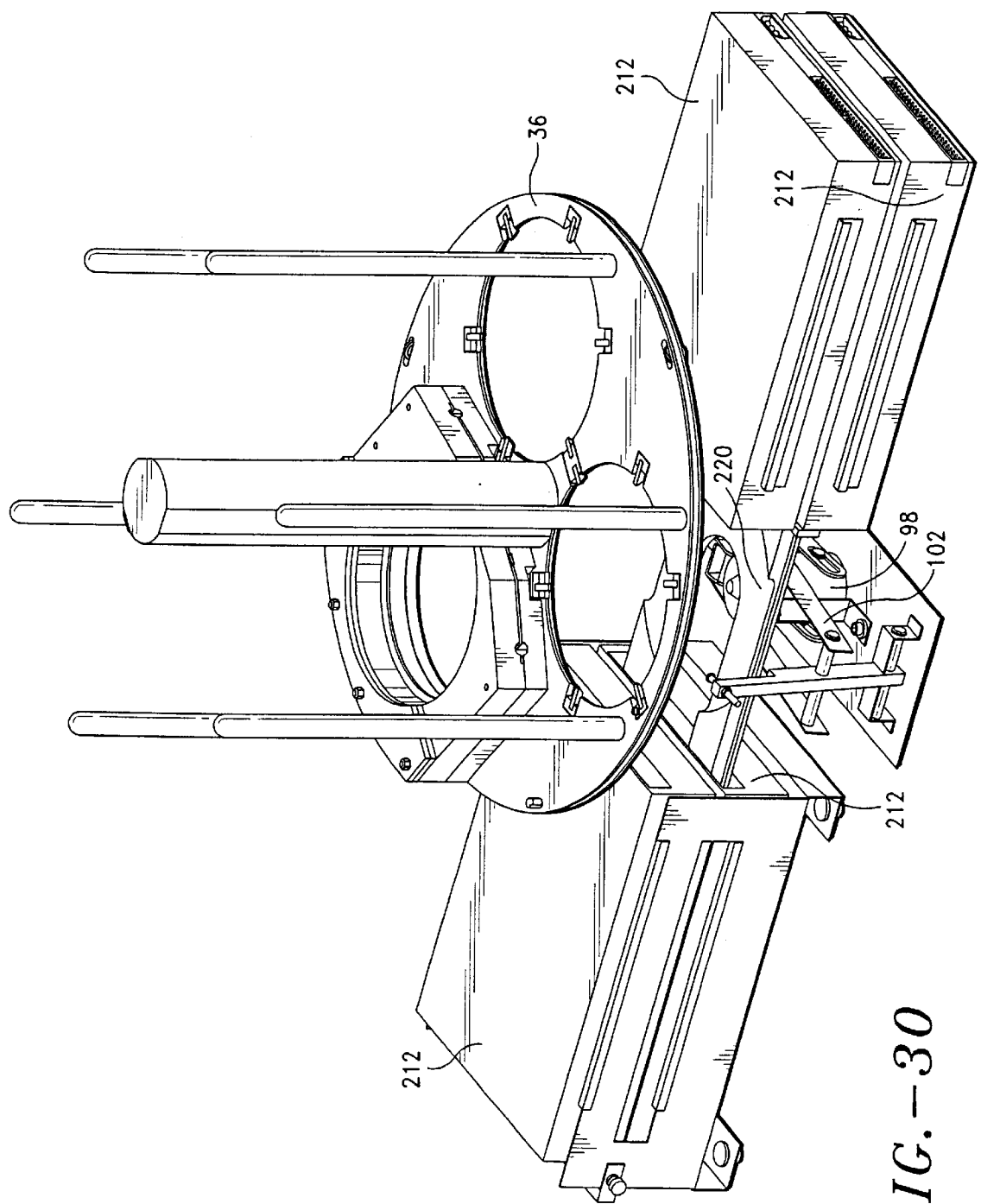
FIG. 30 shows a perspective view of the turntable and multiple recorders of FIG. 29, stacked and aligned in accordance with the present invention.

FIG. 30 shows the disk recorders 212, the turntable 36, the mechanical linkage 102 and the elevator pin 98. The disk recorders 212 are stacked in two discrete stacks. The two stacks oppose each other. The elevator pin 98 is interposed between the opposing stacks.

Figure 31:
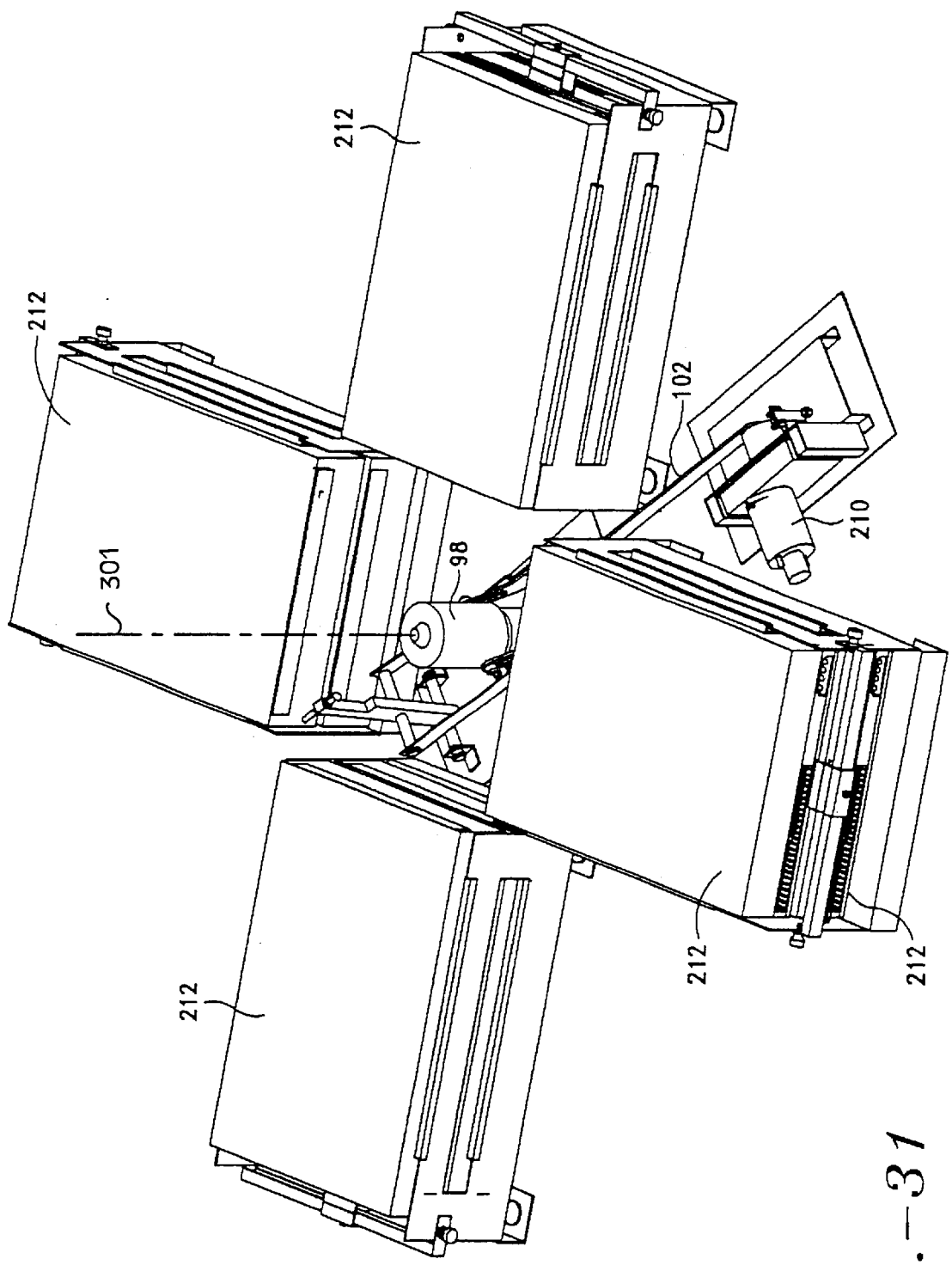
FIG. 31 shows a perspective view of the turntable and multiple recorders stacked and aligned in a radial array in accordance with the present invention.

FIG. 31 shows a variation of the invention, wherein the elevator pin 98 defines a central axis 301, the disk recorders 212 stack in a radial array with respect to the central axis 301. The mechanical linkage 102 and elevator pin 98 are interposed centrally between the recorders 212. The elevator pin 98 telescopes to lift disks, at varying heights, from each of the stacked disk recorders 212.

Although the elevator pin 98 aligns with the central axis 301, it can be appreciated that depending on relative position of the disk recorders 212 and the turntable, the elevator pin 98 may be positioned adjacent any of the disk recorders 212. According to another variation, multiple elevator pins 98 may be used. In accordance with the present invention, the elevator pin 98 may be laterally moveable to lift disks from any of the disk recorders 212. Alternatively, the recorders 212 may be moveable, laterally for example, to enable the elevator pin 98 to lift disks from the recorders 212.

Figure 32:
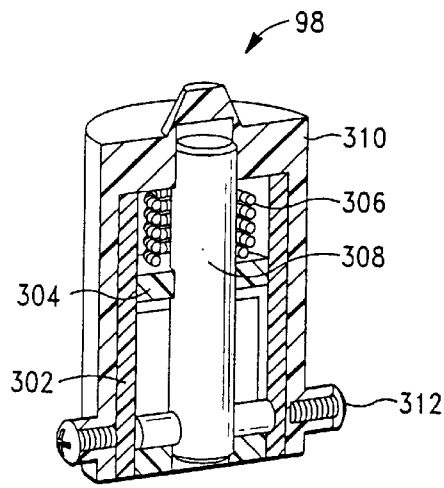
FIG. 32 and FIG. 33 show a perspective view of an elevator pin in accordance with the present invention in a retracted and extended configuration, respectively.

FIG. 32 shows the elevator pin 98 in a retracted configuration. The elevator pin 98 includes multiple sleeves. The sleeves include a fixed sleeve 302, an intermediate sleeve 304, a spring member 306, an alignment pin 308, and a working sleeve 310. The intermediate sleeve 304 aligns the working sleeve 310 with the fixed sleeve 302 when the elevator pin 98 telescopes.

The cylindrical sleeves coaxially align and slide with respect to each other to enable the elevator pin 98 to telescope from a retracted configuration to an extended configuration. The spring member 306 contacts least one sleeve and wraps helically around the alignment pin 308 to bias the sleeves apart. The intermediate sleeve 304 slidably retains the alignment pin 308.

The fixed sleeve 302 is affixed to the housing and has an outside diameter, which is relatively smaller than the working sleeve 310 outside diameter. The working sleeve 310 includes fasteners 312. The fasteners 312 attach to the mechanical linkage 102 (FIG. 31) to enable the mechanical linkage 102 to actuate the elevator pin 98.

Figure 33:
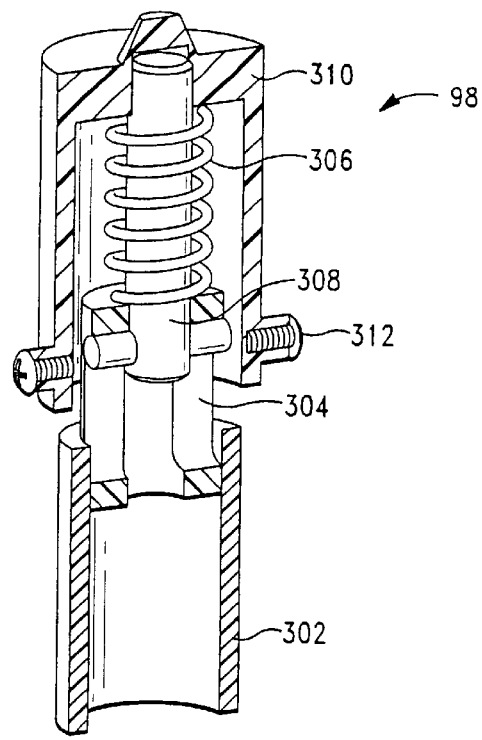

FIG. 33 shows the elevator pin of FIG. 32 in an extended configuration. The spring member 306 includes a helical spring with two ends. The helical spring is in coaxial alignment within the working sleeve 310. One end pushes against the working sleeve 310. The other end pushes against the intermediate sleeve 304. The spring member 306 functions to sequence movement of the working sleeve 310 relative to the intermediate sleeve 304 during elevator pin 98 extension.

Elevator pin 98 extension is a two-stage process. During the first stage, the working sleeve 310 slides along the intermediate sleeve 304. The spring member 306 biases the intermediate sleeve 308 in a fixed position within the fixed sleeve 302. The second stage begins when the working sleeve 310 extends to reach a maximum extension relative to the intermediate sleeve. The spring member 306 lengthens and allows the intermediate sleeve 304 to slide. The intermediate sleeve 304 slides within the fixed sleeve 302 to enable the working sleeve 310 to extend. Accordingly the working sleeve 310 cooperates with the intermediate sleeve 304 to enables optimal extension of the elevator pin 98 while maintaining precise alignment between the working sleeve 310 and the fixed sleeve 302 during both the initial and later stages of elevator pin 98 extension.

Figure 34:
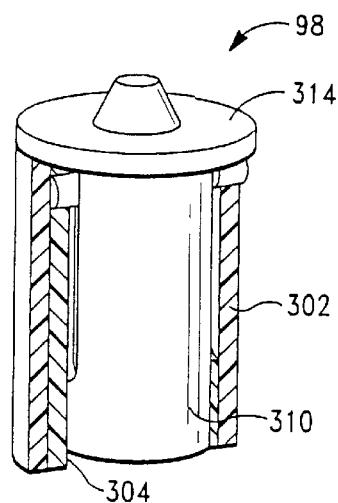
FIG. 34 and FIG. 35 show a perspective view of a variation of an elevator pin in accordance with the present invention in a retracted and extended configuration, respectively.
Figure 35:
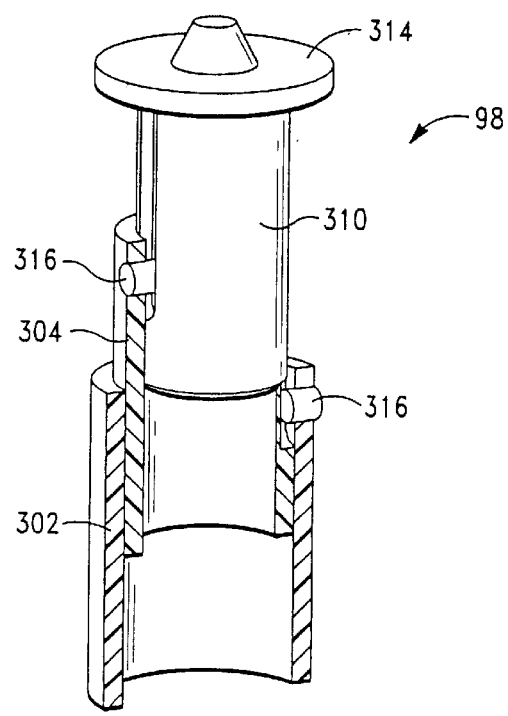

FIG. 34 and FIG. 35 show a variation of the elevator pin 98 in a retracted configuration and in an extended configuration, respectively. The fixed sleeve 302 surrounds the working sleeve 310. The working sleeve 310 includes a cap 314, which overhangs the fixed sleeve 302. During extension, the working sleeve 310 and the intermediate sleeve 304 rotates long a helical path with respect to the fixed sleeve 302. Accordingly, the working sleeve 310 rotates to extend the elevator pin 98.

Figure 36:
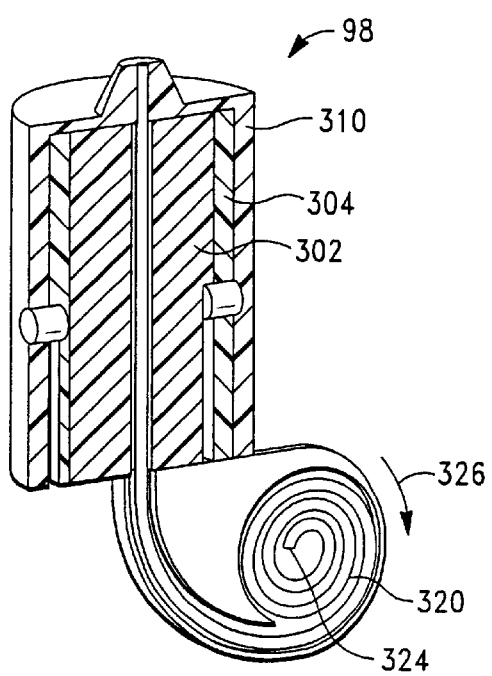
FIG. 36 and FIG. 37 show a perspective view of a variation of an elevator pin in accordance with the present invention in a retracted and extended configuration, respectively.

FIG. 36 shows a variation of the telescoping elevator pin 98. The elevator pin 98 has a coil spring 320 with two ends 322 and 324. The end 322 of the coil spring 320 presses against the working sleeve 310 to slide the working sleeve 310 relative to the intermediate sleeve 304 and thereby actuate the elevator pin 98. Rotation of one end 324 of the coil spring in the direction of the arrow 326 uncoils the spring 320, causing the other end 322 to press against the working sleeve 310 and extend the elevator pin 98. Counter-rotation of the one end 322 of the coil spring 320 causes the other end 324 to retract the elevator pin 98.

Figure 37:
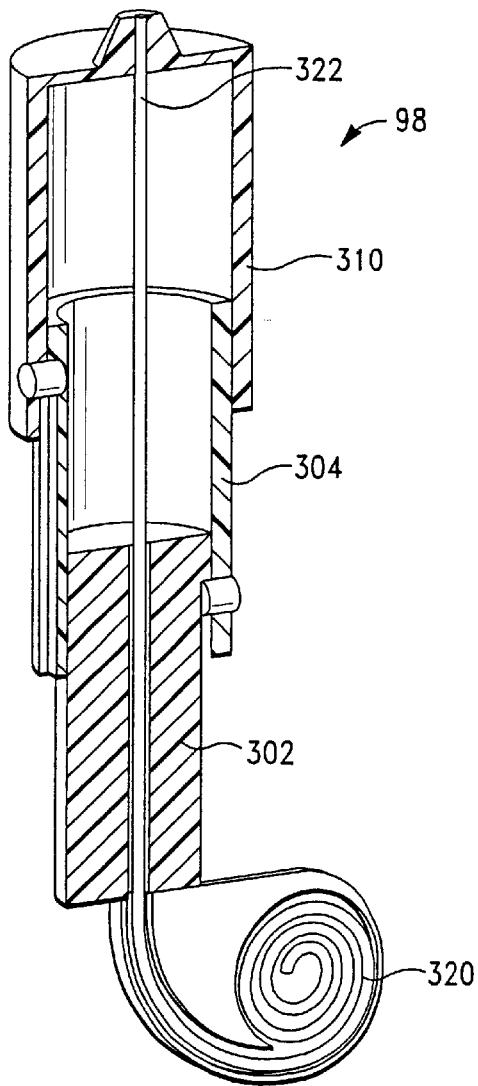

FIG. 37 shows the elevator pin 98 fully extended. The second end 322 presses against the working sleeve 310. The spring 320 partially uncoils to support the elevator pin 98 in the fully extended configuration.

Figure 38:
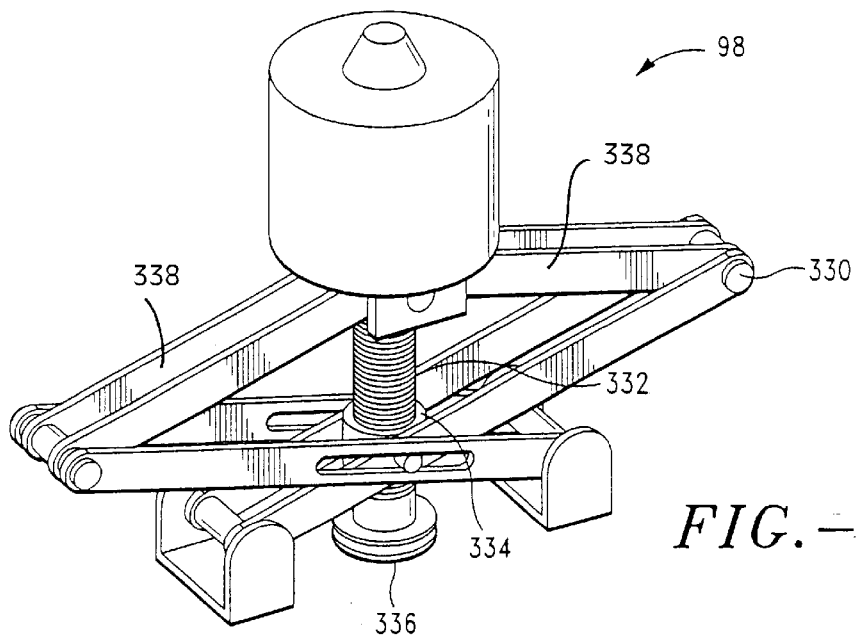
FIG. 38 and FIG. 39 show a perspective view of a variation of an elevator pin in accordance with the present invention in a retracted and extended configuration, respectively.
Figure 39:
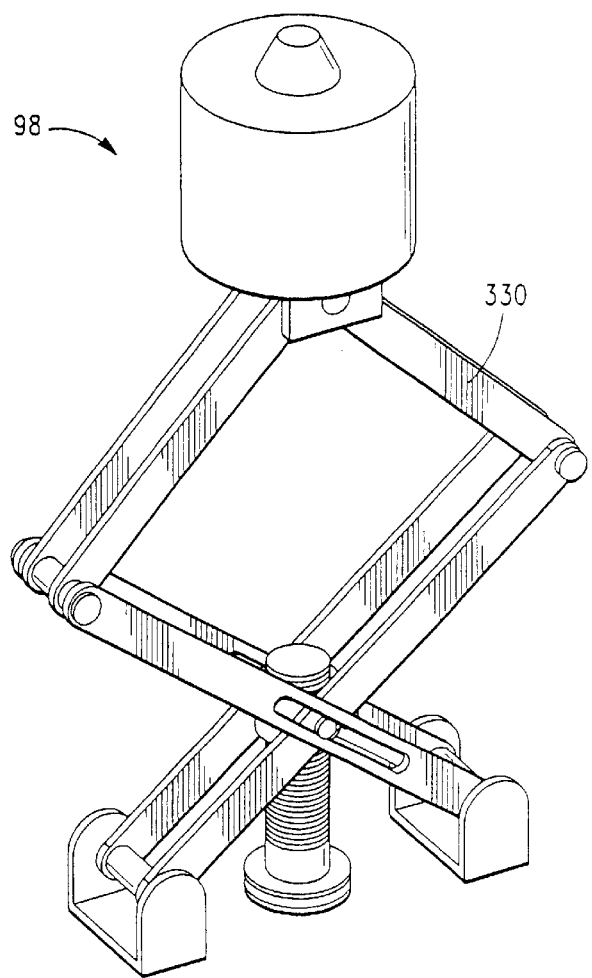

FIGS. 38 and 39 shows a linkage assembly 330 and elevator pin 98 combination in a retracted and extended configuration, respectively. The linkage assembly 330 includes a rotatable actuator 332, a threaded sleeve 334 and a pulley mechanism 336. The actuator 332 includes a threaded shaft. The linkage assembly 330 includes linkage members 338. The linkage members 338 have scissor joints. A motor rotates the pulley mechanism 336. The pulley mechanism 336 rotates the actuator 332 with respect to the sleeve 310. The sleeve 310 is joined to at least one linkage member 338 so when the sleeve 310 moves, the linkage assembly 330 scissors to actuate the elevator pin 98. The linkage assembly 330 extends and retracts the elevator pin 98.

This detailed description describes various aspects of the present invention. This detailed description is by way of example only, and is not intended to limit the present invention. Numerous alternatives exist to the various aspects of the invention, for example, the sleeves need not be cylindrical and hollow, but instead, may be formed from a frame. Additionally, the means for actuating the elevator pin may include pneumatic actuators, solenoids, and other devices for extending and retracting the elevator pin. With these and other variations in mind, the invention is to be limited only by the following claims.

We claim:

1. A disk handling system, comprising:

a housing;

a turntable mounted on the housing;

a telescoping elevator pin mounted on the housing, the elevator pin telescopes for moving disks from the turntable into a stack;

a means for actuating the elevator pin;

the elevator pin has cylindrical sleeves, which coaxially align and slide with respect to each other to enable the elevator pin to telescope; and the elevator pin has a spring member in contact with at least one sleeve, the spring member biases the sleeves apart.

2. A disk handling system, comprising:

a housing;

a turntable mounted on the housing;

a telescoping elevator pin mounted on the housing, the elevator pin telescopes for moving disks from the turntable into a stack;

a means for actuating the elevator pin, the means for actuating includes a motor and a mechanical linkage, the mechanical linkage attaches to the motor and to one cylindrical sleeve of the elevator pin, the motor rotates to reciprocate the mechanical linkage and actuate the elevator pin;

the elevator pin has cylindrical sleeves, which coaxially align and slide with respect to each other to enable the elevator pin to telescope;

the elevator pin has a spring member in contact with at least one sleeve, the spring member biases the sleeves apart; and wherein the mechanical linkage fastens to the outer sleeve.

* * * * *

UNITED STATES PATENT AND TRADEMARK OFFICE
CERTIFICATE OF CORRECTION

PATENT NO. : 6,337,842                                                                  Page 1 of 1
DATED : January 8, 2002
INVENTOR(S) : David Wolfer and Wray Russ It is certified that error appears in the above-identified patent and that said Letters Patent is hereby corrected as shown below:

Title page,
ABSRACT,
Line 4, delete "form" and insert -- from --; and
Line 12, delete "form" and insert -- from --.

Column 2,
Line 21, delete "an fixed" and insert -- a fixed --; and
Line 22, delete "an working sleeve" and insert -- a working sleeve --.

Signed and Sealed this

Seventh Day of May, 2002

Attest:

*Attesting Officer*

JAMES E. ROGAN
*Director of the United States Patent and Trademark Office*